United States Patent
Fujigaya

(10) Patent No.: US 8,499,182 B2
(45) Date of Patent: Jul. 30, 2013

(54) SEMICONDUCTOR DEVICE AND DATA PROCESSING SYSTEM

(75) Inventor: Masaki Fujigaya, Kawasaki (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 298 days.

(21) Appl. No.: 13/031,489

(22) Filed: Feb. 21, 2011

(65) Prior Publication Data

US 2011/0208987 A1 Aug. 25, 2011

(30) Foreign Application Priority Data

Feb. 22, 2010 (JP) ................................. 2010-035604

(51) Int. Cl.
*G06F 1/00* (2006.01)
*G06F 1/26* (2006.01)
*G06F 15/00* (2006.01)
*G06F 11/00* (2006.01)
*H04M 1/00* (2006.01)

(52) U.S. Cl.
USPC ............. 713/323; 713/320; 713/324; 712/28; 712/32; 714/15; 455/574

(58) Field of Classification Search
USPC ........................... 713/320, 323, 324; 455/574
See application file for complete search history.

(56) References Cited

U.S. PATENT DOCUMENTS

| 5,167,024 A * | 11/1992 | Smith et al. .................... 713/322 |
| 6,055,642 A | 4/2000 | Ikemoto |
| 6,665,802 B1 * | 12/2003 | Ober ............................. 713/320 |
| 6,826,705 B2 * | 11/2004 | Tani ............................... 713/320 |
| 7,051,306 B2 * | 5/2006 | Hoberman et al. ........... 716/127 |
| 2006/0259800 A1 * | 11/2006 | Maejima ........................ 713/300 |
| 2008/0178030 A1 | 7/2008 | Koizumi | |

* cited by examiner

*Primary Examiner* — Stefan Stoynov
(74) *Attorney, Agent, or Firm* — Womble Carlyle

(57) ABSTRACT

A semiconductor device has reduced power consumption and processing time associated with the release of a low power consumption state set by a central processing unit thereof. The semiconductor device controls a relationship between a forcible release and reset of the low power consumption state previously set by the central processing unit. In one embodiment, a forcible release control circuit forcibly releases the supply and stop of power and clocks previously set to one or more controlled circuits, only during a period required by a signal outputted from a requesting circuit, which requesting circuit may be either internal to the device or external to the device. Once the request signal from the requesting circuit has ended, the controlled circuits and, if appropriate, the central processing unit as well, are restored to the original low power consumption state.

40 Claims, 25 Drawing Sheets

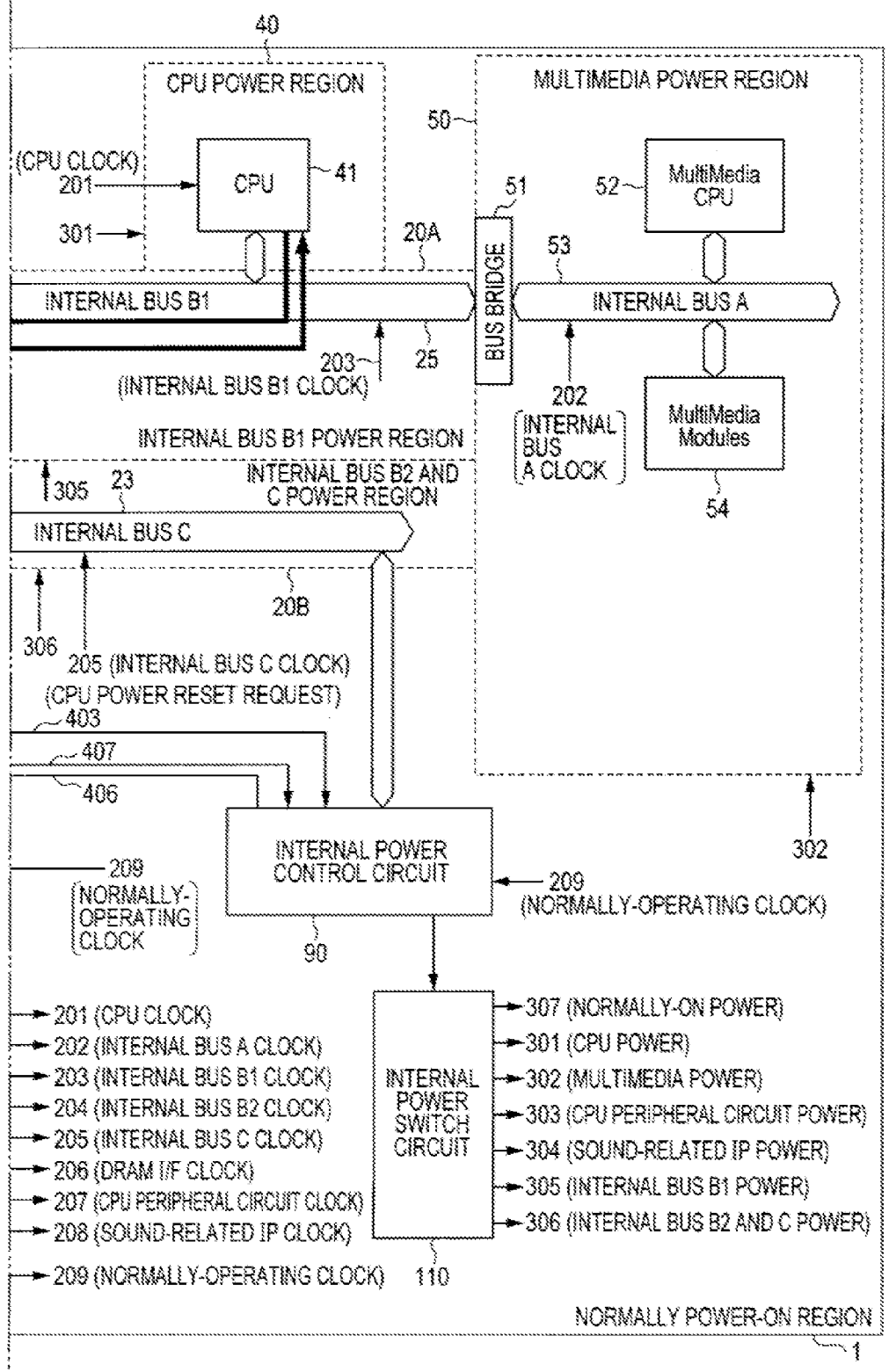

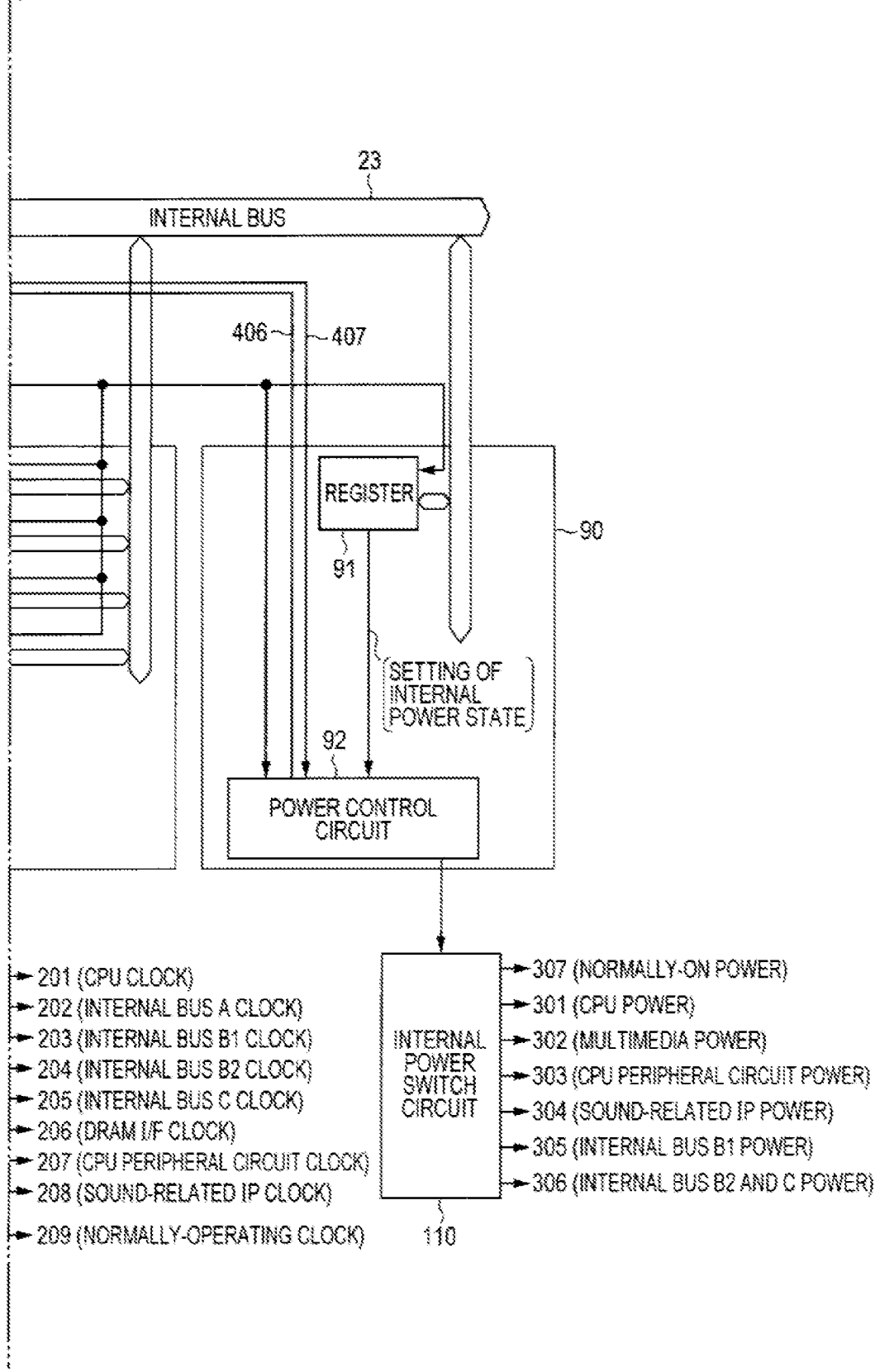

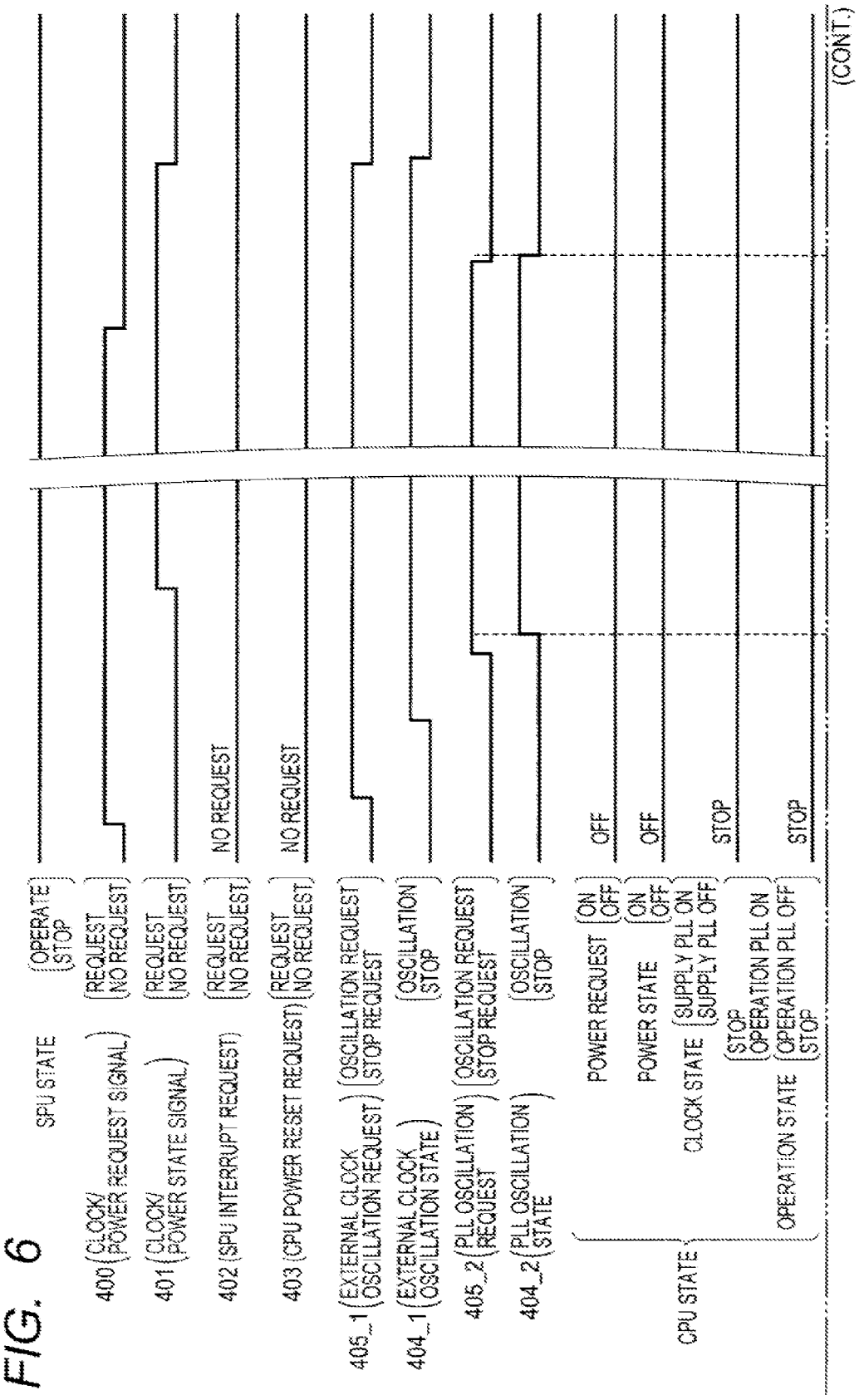

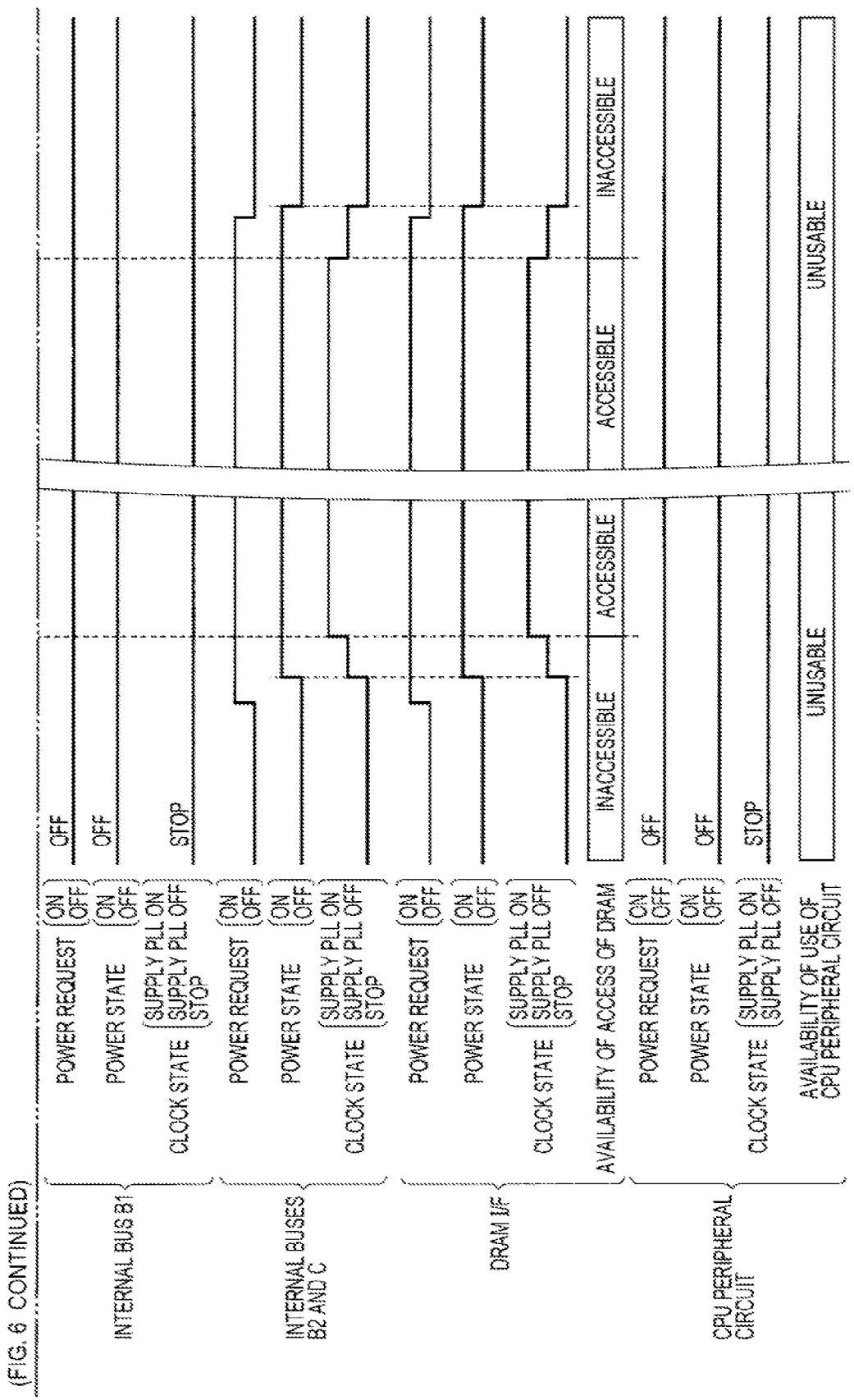

(CONT.)

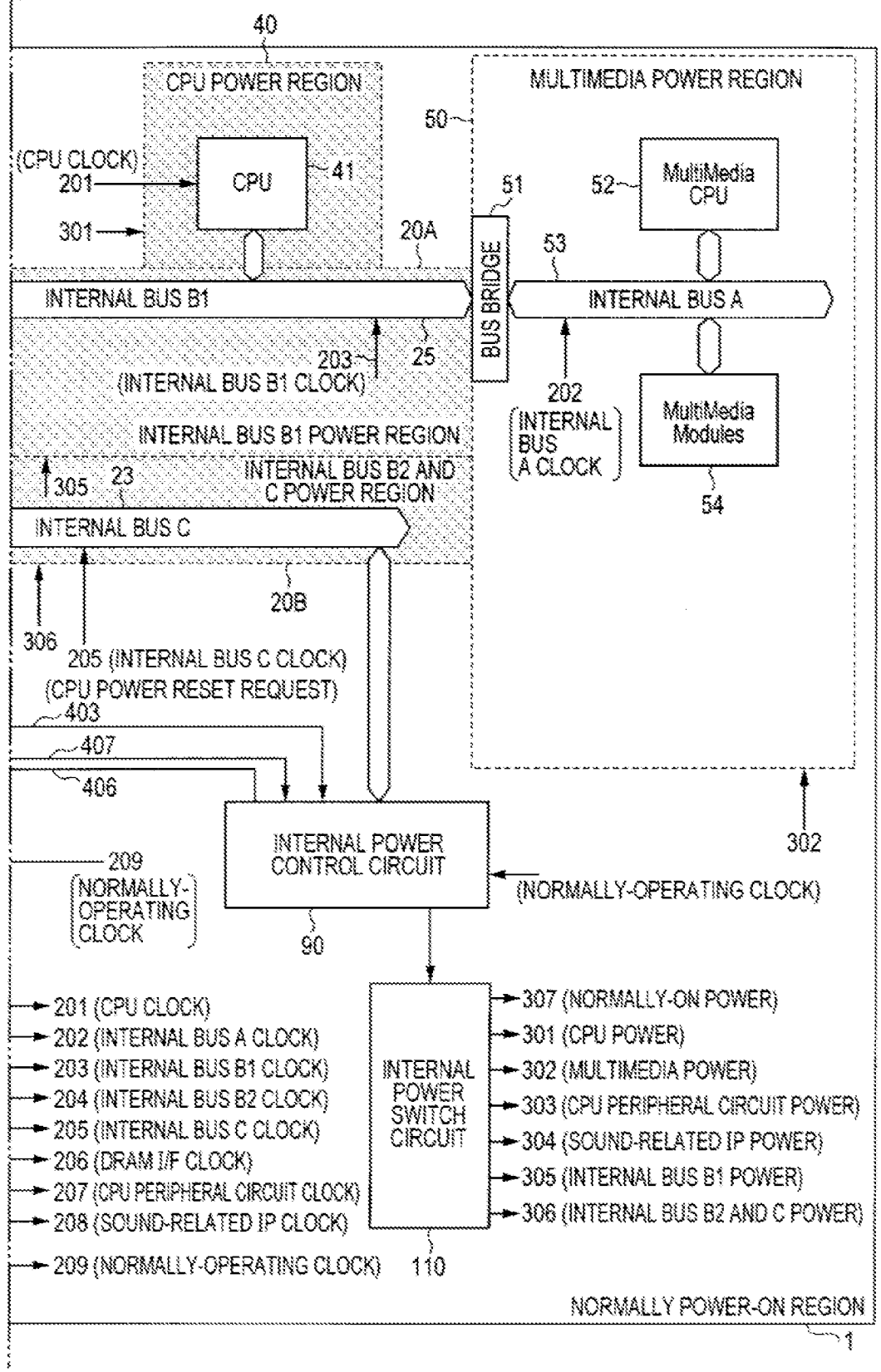

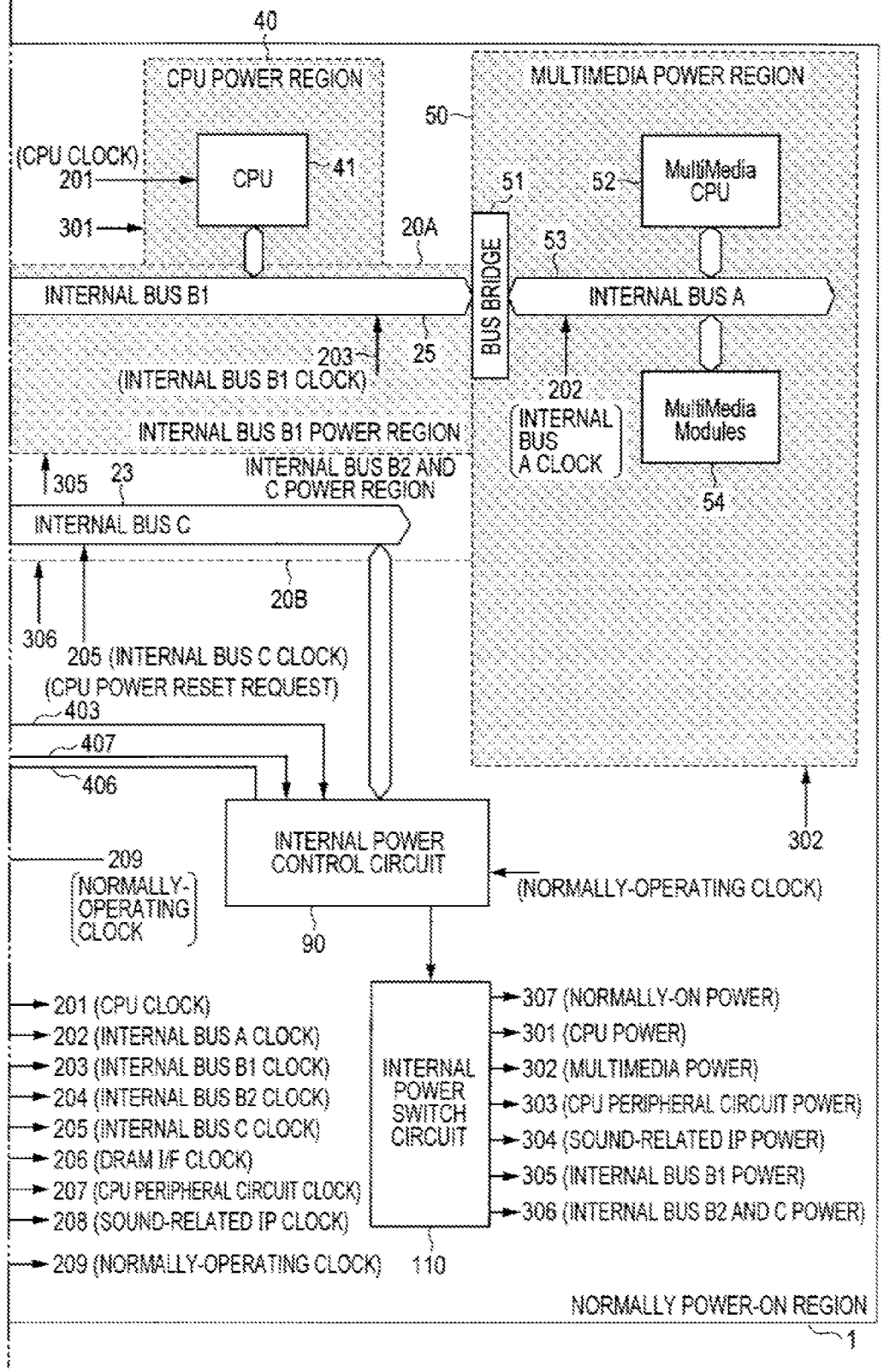

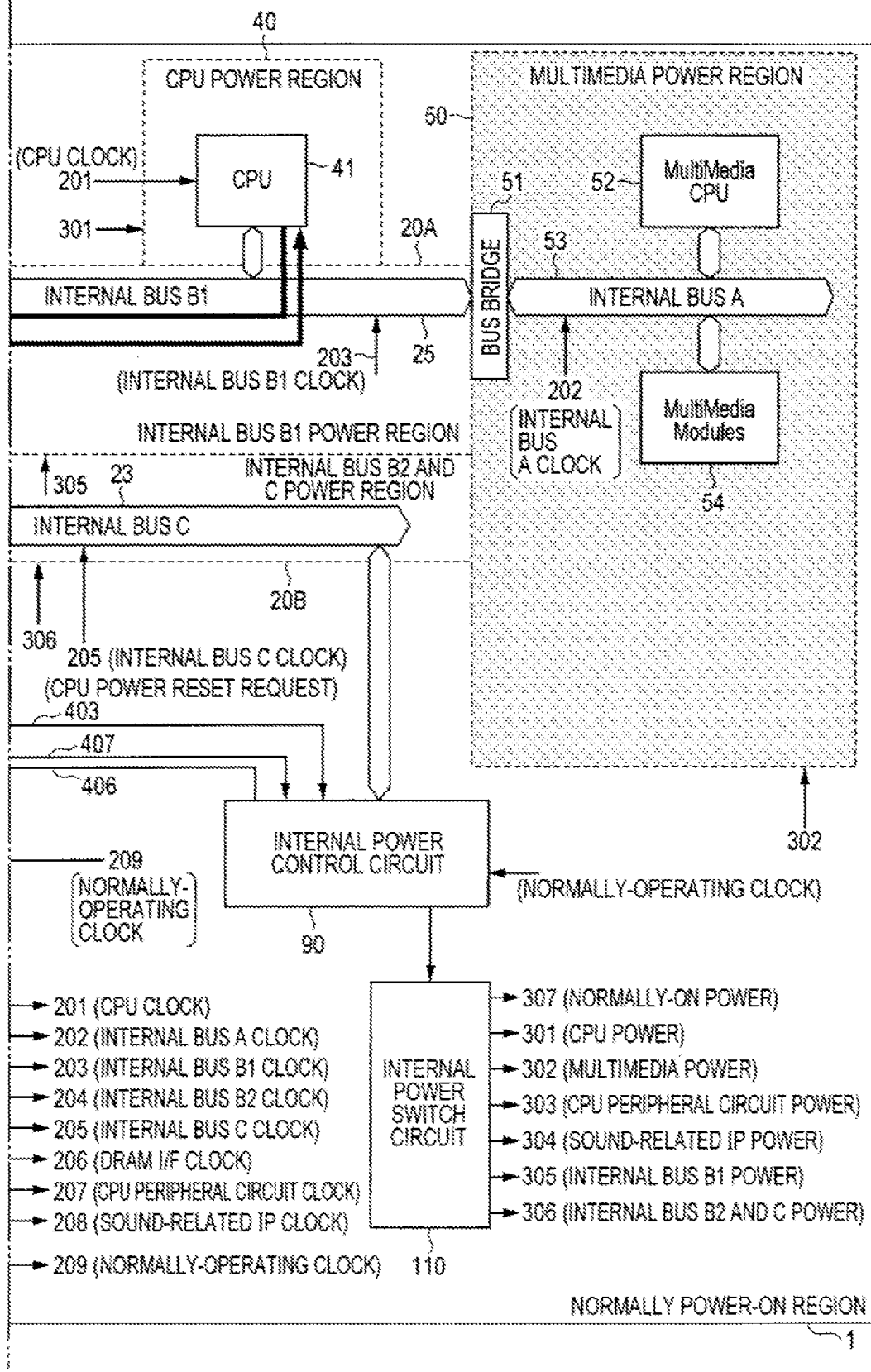

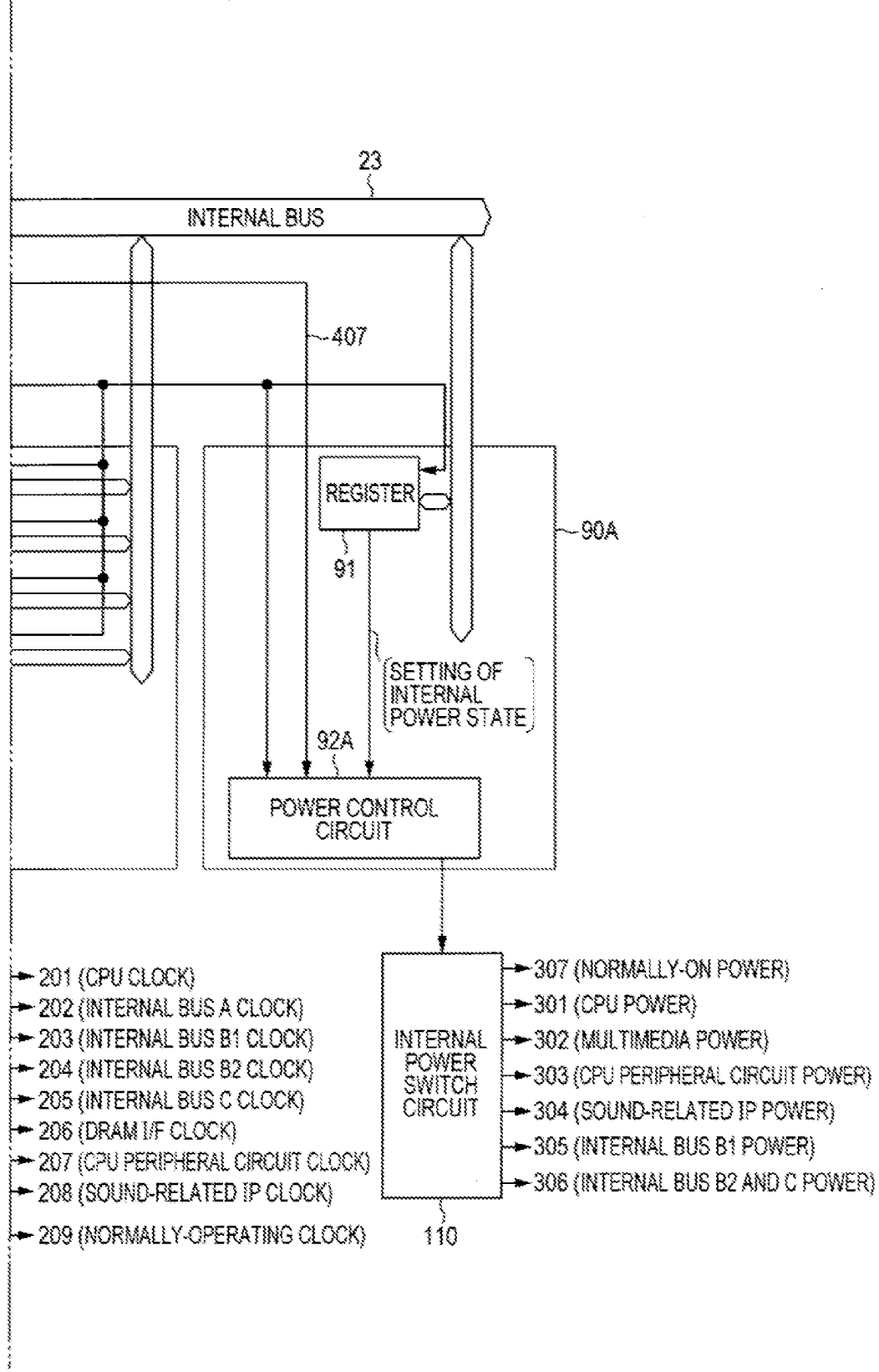

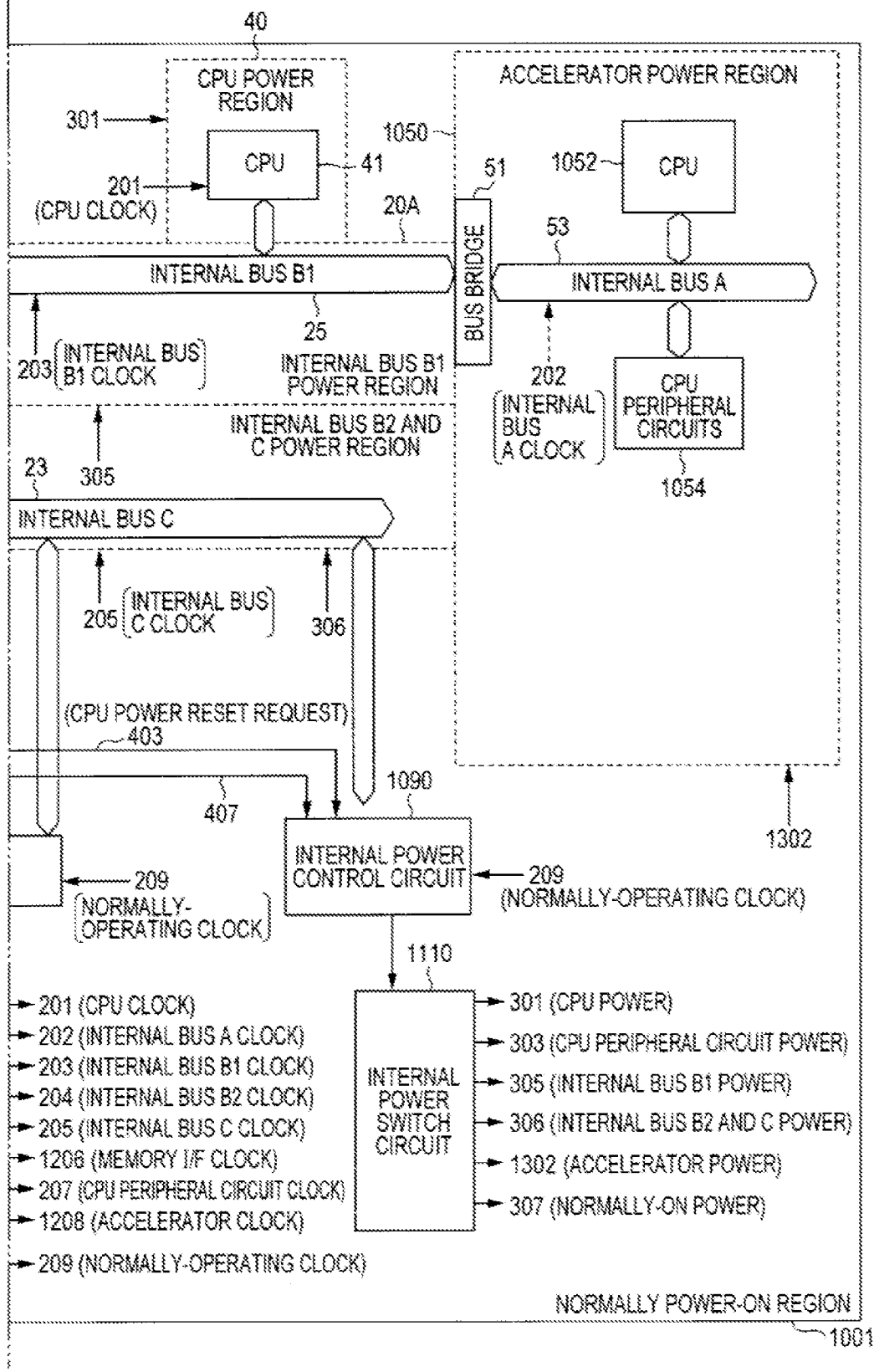

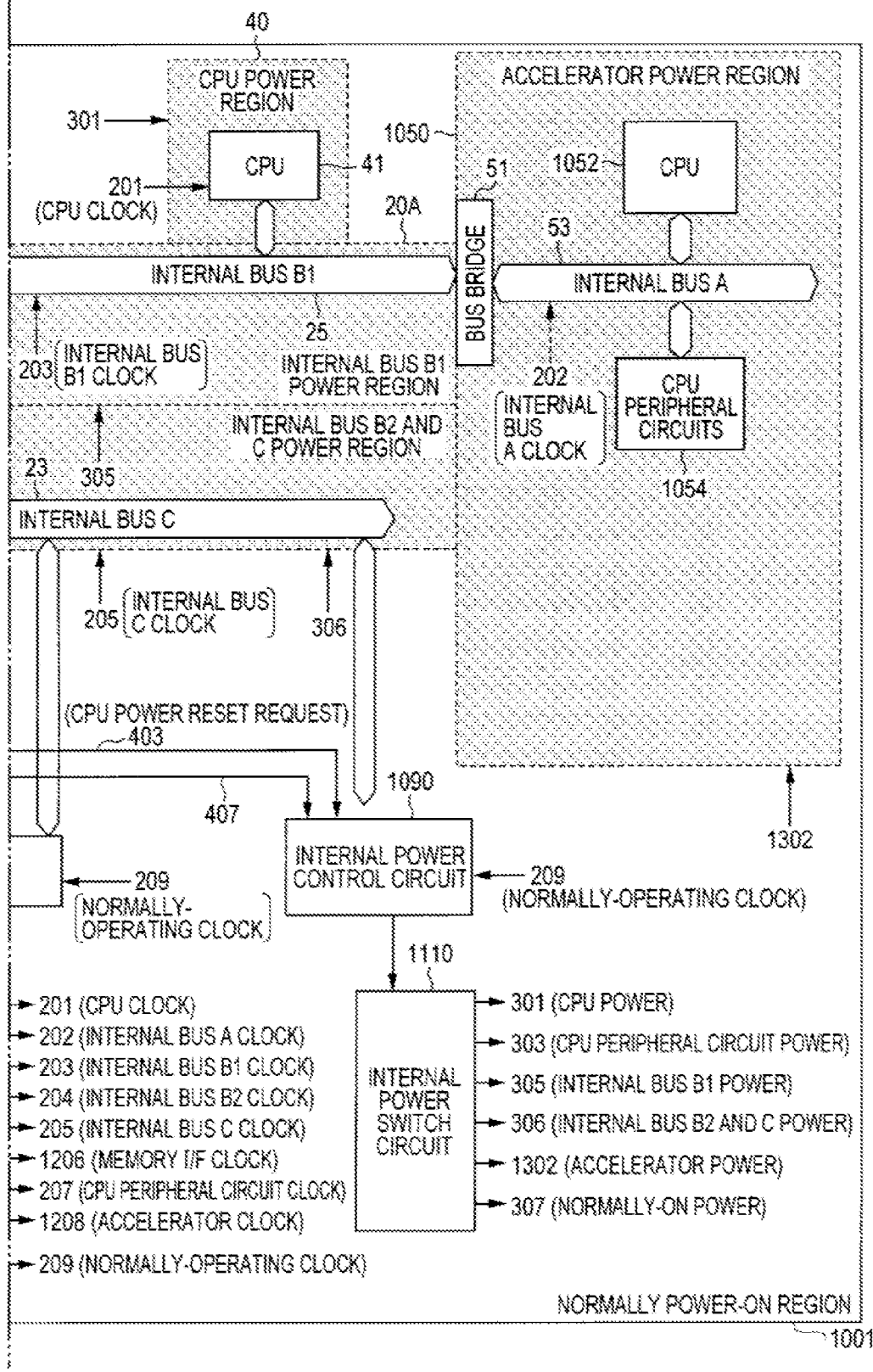

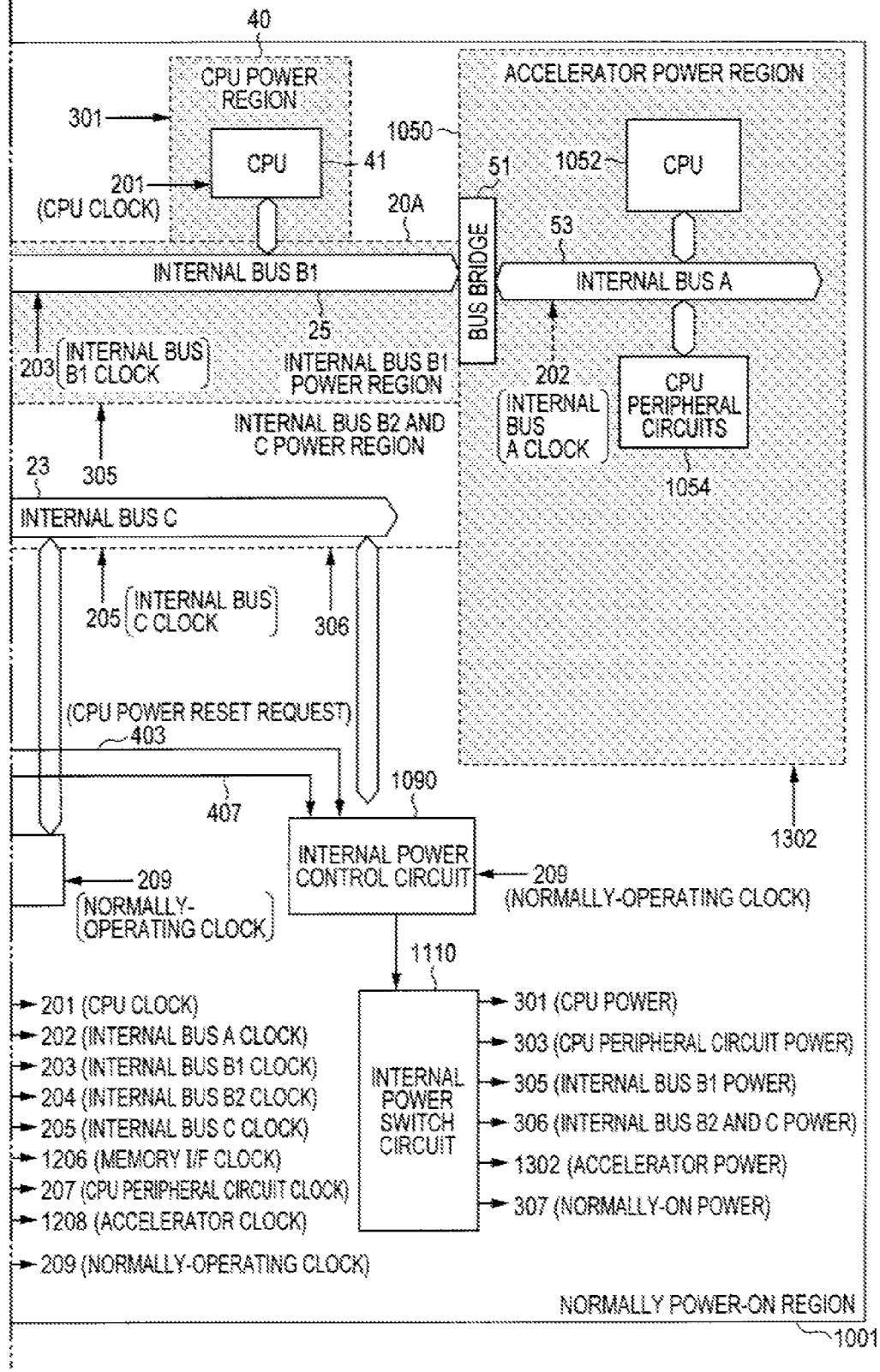

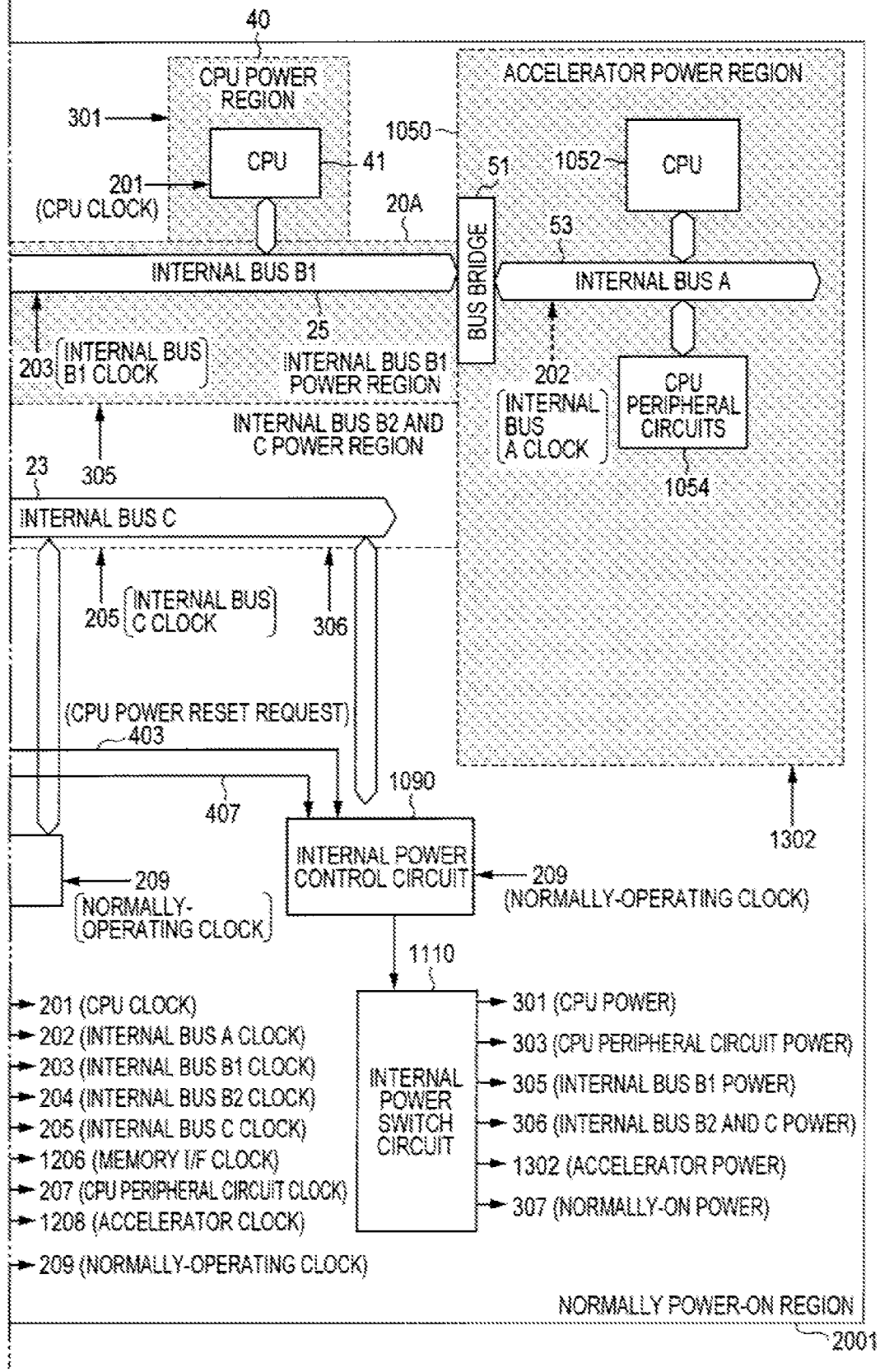

SEMICONDUCTOR DEVICE AND DATA PROCESSING SYSTEM

CROSS-REFERENCE TO RELATED APPLICATIONS

The disclosure of Japanese Patent Application No. 2010-35604 filed on Feb. 22, 2010 including the specification, drawings and abstract is incorporated herein by reference in its entirety.

BACKGROUND OF THE INVENTION

The present invention relates to a semiconductor device wherein control of the stop and supply of power and clocks is performed in block units of internal circuits, and relates to a technology effective if applied to, for example, a microcomputer.

As a semiconductor device such as a microcomputer, there is known one having the function of in order to reduce power consumption at standby mode (standby state), for example, dividing the inside of a semiconductor device into functional blocks, and individually controlling the supply and stop of power and individually supplying or stopping clocks to the functional blocks. For example, control registers which give instructions or data for the stop or supply of power and clocks, are respectively disposed in a power control circuit and a clock control circuit for controlling each functional block. A central processing unit executes an instruction to operate each of the control registers, thereby making it possible to control the stop and supply of the power and clocks.

Added to that, a patent document 1 (Japanese Unexamined Patent Publication No. 2008-181329, also US20080178030A1) has described that an interrupt power control table is disposed in a power control circuit, and the supply and resumption of power and clocks are carried out in each functional block by interrupt control conducted in accordance with the interrupt power control table. Further, a patent document 2 (Japanese Unexamined Patent Publication No. Hei 11(1999)-202968, also U.S. Pat. No. 6,055,642) has described that an external signal supplied from an external terminal is used to thereby make a transition to a low power consumption mode at a microcomputer, whereby the operation of a central processing unit is not required to transition to the low power consumption mode. The contents of the aforementioned patent documents are incorporated by reference to the extent necessary to understand the present invention.

When, however, each of the control registers is operated by the execution of the instruction by the central processing unit to control the stop or supply of the power and clocks to each functional block, the central processing unit should be caused to execute instructions for operating at least the control registers where the state of the stop or supply of the power and clocks to the functional blocks is changed. There also occurs a case where the supply of the power and clocks to the central processing unit being in operation stop should be resumed only for this purpose. It is not possible to reduce power consumption by the central processing unit as intended.

The technology of the patent document 1, which resumes the supply of the power and clocks using the interrupt power control table, realizes low power consumption in that the operation of the central processing unit is not required to release a low power consumption state, but does not take into consideration restoring the low power consumption state previously indicated by CPU or the like.

The technology disclosed in the patent document 2 realizes low power consumption in that the transition to the low power consumption mode is done by the external signal supplied from the external terminal to thereby make unnecessary the operation of the central processing unit upon the transition to the low power consumption mode, but does not take into consideration the release of the low power consumption mode.

There is a case where even though the transition to the low power consumption state (mode) is caused by input from the external terminal and restoring from the low power consumption state is conducted using an interrupt, it is necessary to adopt control based on priorities or arbitration between once-set low power consumption state and the release of its subsequent low power consumption state. Assuming that, for example, the process of restoring to the low power consumption state again after the low power consumption state is temporarily released and the required processing is conducted, is repeated, suitable control for releasing and restoring the low power consumption state may be necessary.

SUMMARY OF THE INVENTION

One object is to provide a semiconductor device capable of cutting down power consumption and processing time associated with the release of a low power consumption state set by a central processing unit, and capable of easily controlling a relationship between a forcible release and reset of the low power consumption state previously set by the central processing unit.

Another object is to provide a data processing system which is capable of cutting down power consumption and processing time associated with the release of low power consumption control of a semiconductor device, and can control a relationship between a forcible release and reset of a low power consumption state of the semiconductor device.

The above, and other objects and novel features of the present invention will become apparent from the description of the present specification and the accompanying drawings.

A forcible release control circuit is adopted which forcibly releases the supply and stop of power and clocks previously set in one or more other controlled circuits, only during a period required by a signal outputted from a requesting circuit, for requiring a control mechanism for low power consumption, which controls the stop and supply of the power and clocks to a central processing unit itself and controlled circuits, to stop the power and clocks. It is not necessary to interpose the central processing unit for the purpose of the forcible release. Further, if the request from the requesting circuit is ended, then the central processing unit is restored to its original low power consumption state.

Thus, the central processing unit need not be reset to an operable state to forcibly release a low power consumption state of other controlled circuits even if the central processing unit itself is in a low power consumption state. This can contribute to low power consumption and the shortening of a processing time in this respect. Since the central processing unit is restored to the original low power consumption state if the request from the requesting circuit is ended, control for defining a relationship between the forcible release of the low power consumption state previously set upon execution of an appropriate instruction by the central processing unit, and its restoration is simple.

Thus, it may be possible to cut down power consumption and a processing time with the release of a low power consumption state set by a central processing unit. Further, control for defining a relationship between a forcible release of the low power consumption state previously set by the central processing unit, and its restoration becomes easy.

BRIEF DESCRIPTION OF THE DRAWINGS

FIG. 6 is a timing chart showing detailed operating timings taken during periods of timings a and b shown in FIG. 5;

DETAILED DESCRIPTION OF THE PREFERRED EMBODIMENTS

1 Summary of Embodiments

Figure 1:
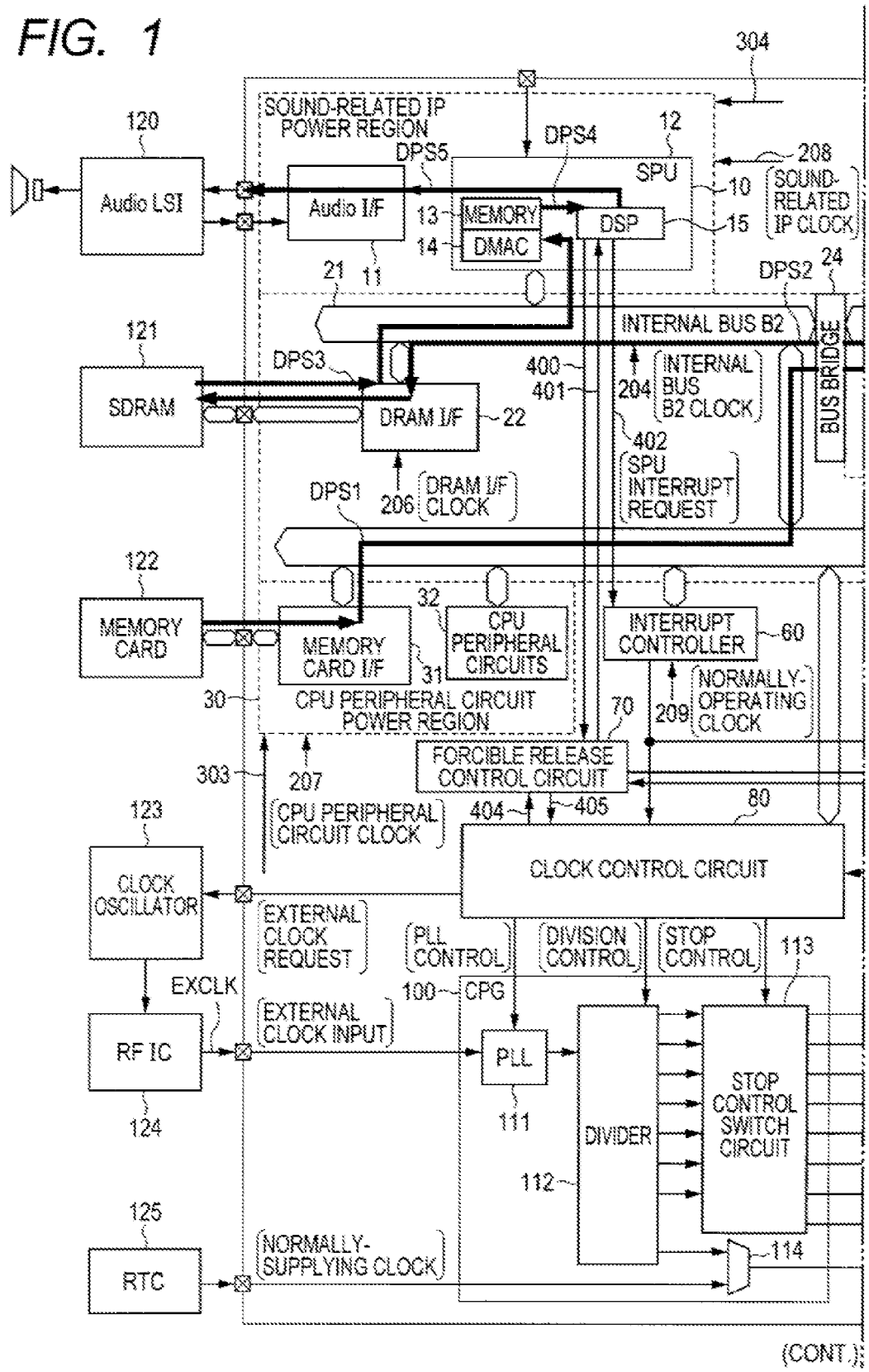
FIG. 1 is a block diagram illustrating a configuration of a microcomputer according to a first embodiment of the present invention.

Summary of exemplary embodiments of the invention disclosed in the present application will first be explained with reference to the following numbered paragraphs. Reference numerals in the accompanying drawings referred to with parentheses in the description of the summary of the exemplary embodiments only illustrate elements included in the concept of components to which the reference numerals are given.

[1] <Forcible Release Control Circuit Based on Internal Signal>

A semiconductor device (1) according to the exemplary embodiment of the present invention comprises: (a) a central processing unit (41) for controlling the stop (suspension) and supply of power and for control of the stop and supply of clocks, and for executing instructions, (b) a plurality of controlled circuits (circuits located in 10, 20A, 20B and 30) which are subject to control of the stop and supply of power and clocks, (c) power and clock control circuits (80 and 90) which respectively control the stop and supply of power and clocks to the central processing unit and the controlled circuits, based on the execution of an instruction by the central processing unit, and (d) a forcible release control circuit (70) which forcibly releases the supply and stop of power and clocks conducted on a predetermined controlled circuit (each circuit located in 20B) by the power and clock control circuits only during a period in which a power and clock request signal (400) is outputted from the requesting circuit (12).

According to the above, there is no need to interpose the central processing unit upon forcibly releasing a state of the stop of power and clocks set to the specific controlled circuit by the central processing unit itself. Therefore, the central processing unit needs not be reset to an operable state to forcibly release a low power consumption state of each of other controlled circuits even if the central processing unit is in a low power consumption state. This can contribute to low power consumption and the shortening of a processing time in this respect. Since the central processing unit is restored to the original low power consumption state if the request for the supply of power and clocks from the requesting circuit is ended, control for defining a relationship between the forcible release relative to the state of the stop of power and clocks previously set by the execution of an appropriate instruction by the central processing unit, and its restoration, becomes simple.

[2] <Power and Clock Control Circuits>

In the semiconductor device described in paragraph [1], the power and clock control circuits may include (a) control registers (81 through 84 and 91—see FIG. 2) which hold or retain control data for controlling the stop and supply of power and clocks to the plurality of the controlled circuits, and (b) control logics (86 through 88 and 92) which respectively input the control data in the control registers and an instruction signal to the forcible release control circuit within the device to thereby control the supply and stop of power and clocks to the controlled circuits. The control logics allow the power and clocks to be supplied when the control data indicates the supply of power and clocks, allow the power and clocks to stop when the control data indicates the stop of power and clocks and the power and clock request signal indicates no request for the supply of power and clocks, and allow the power and clocks to be supplied when the control data indicates the stop of the power and clocks and the power and clock request signal requests the supply of the power and clocks.

The control for defining the relationship between the forcible release relative to the state of the stop of power and clocks previously set by the execution of an instruction by the central processing unit, and its restoration, can simply be carried out by the corresponding control logic.

[3] <Release Timing and Reset Timing>

In the semiconductor device described in paragraph [1] or [2], the forcible release control circuit receives state signals (404_1 through 404_4 and 406) each indicative of the state of the supply and stop of power and clocks to the controlled circuits from the power and clock control circuits and controls a first timing provided to release the supply and stop of the power and clocks and a second timing provided to restore the same from their release, referring to the received state signals.

It is possible to appropriately perform timing control on the release and reset by means of a handshake.

[4] <Release Timing and Reset Timing>

In the semiconductor device described in paragraph [1] or [2], the forcible release control circuit controls a first timing provided to release the supply and stop of the power and clocks and a second timing provided to restore the same from their release, using a timer.

In such case, receiving state signals for the timing control can be made unnecessary.

[5] <Interrupt Controller>

The semiconductor device described in paragraph [1] includes an interrupt controller (60) which causes the power and clock control circuits to resume the supply of power and clocks to the central processing unit whose supply thereof has being stopped, in response to an interrupt request (402) supplied from the requesting circuit.

The release of the low power consumption state of the central processing unit which controls the supply and stop of the power and clock to itself, can be carried out by interrupt.

[6] <Data Processing Circuit and First Interface Circuit>

In the semiconductor device described in paragraph [5], the requesting circuit may comprise a circuit (12) for processing data fetched therein, i.e., a "data processing circuit". The predetermined controlled circuit referred to above may comprise a first interface circuit (22) for supplying data to be fetched into the requesting circuit, based on a request issued from the requesting circuit.

Thus, before or when data to be processed is lost, the data processing circuit is capable of releasing a low power consumption state of the first interface circuit to receive the supply of necessary data and then restoring the first interface circuit to the low power consumption state after the acquisition of the data.

[7] <Second Interface Circuit>

The semiconductor device described in paragraph [6] further includes a second interface circuit (31) which obtains data to be supplied to the requesting circuit by the predetermined controlled circuit referred to above, through the control of the central processing unit.

Thus, before or when the data to be supplied to the data processing circuit by the first interface circuit is lost, the data processing circuit subjected to the supply of the data can transfer the data captured into the central processing unit via the second interface circuit by interrupt or the like to the first interface circuit.

[8] <Memory Controller and File Memory Controller>

In the semiconductor device described in paragraph [7], the data processing circuit comprises a DMAC (14), a buffer memory (13) which retains data captured by the DMAC, and an arithmetic circuit (15) which performs arithmetic processing on the data fetched into the buffer memory. The first interface circuit may comprise a memory controller (22) which controls a memory coupled to the outside of the semiconductor device. The second interface circuit may comprise a file memory controller (31) which controls a file memory coupled to the outside of the semiconductor device.

[9] <Data Processing System>

A data processing system according to another embodiment of the present invention comprises the semiconductor device (1) described in paragraph [8], a memory (121) coupled to the memory controller included in the semiconductor device from the outside of the semiconductor device, and a file memory (122) coupled to the file memory controller included in the semiconductor device from the outside of the semiconductor device.

[10] <Forcible Release Control Circuit Based on External Signal>

A semiconductor device according to another embodiment of the present invention comprises: (a) a central processing unit (41) for controlling the stop and supply of power and clocks and for executing instructions, (b) a plurality of controlled circuits (circuits located in 1010, 1030 and 1302) subject to control of the stop and supply of power and clocks, (c) power and clock control circuits (1080 and 1090) which respectively control the stop and supply of power and clocks to the central processing unit and the controlled circuits, based on the execution of an instruction by the central processing unit, and (d) a forcible release control circuit (1070) which forcibly releases the supply and stop of power and clocks conducted on the predetermined controlled circuits (circuits located in 1030 and 1010) by the power and clock control circuits only during a period required by a power and clock request signal (1401) received at a first external input terminal (1400) from a requesting circuit external to the device.

The semiconductor device of paragraph [10] is different from the semiconductor device described in paragraph [1] in that the supply and stop of the power and clocks are forcibly released in accordance with the input from the first external input terminal. Similarly, even in the case of the semiconductor device described in the paragraph [10], there is no need to restore the central processing unit to an operable state for the purpose of forcibly releasing a low power consumption state of a controlled circuit even if the central processing unit is in the low power consumption state. This can therefore contribute to low power consumption and the shortening of a processing time. Further, control for defining the relationship between the forcible release relative to the state of the stop of power and clocks previously set by the execution of an instruction by the central processing unit, and its restoration, becomes simple.

[11] <Power and Clock Control Circuits>

In the semiconductor device described in paragraph [10], the power and clock control circuits respectively include (a) control registers (81 through 84 and 91) which hold or retain control data for controlling the stop and supply of power and clocks to the plurality of the controlled circuits, and (b) control logics (86 through 88 and 92) which respectively input the control data in the control registers and an instruction signal to the forcible release control circuit within the device to thereby control the supply and stop of power and clocks to the controlled circuits. The control logics allow the power and clocks to be supplied when the control data indicates the supply of the power and clocks, allow the power and clocks to stop when the control data indicates the stop of the power and clocks and the power and clock request signal indicates no request for the supply of the power and clocks, and allow the power and clocks to be supplied when the control data indicates the stop of the power and clocks and the power and clock request signal requests the supply of the power and clocks.

The control for defining the relationship between the forcible release relative to the state of the stop of power and clocks previously set by the execution of an instruction by the central processing unit, and its restoration, can simply be carried out by the control logic.

[12] <Predetermined Controlled Circuit>

In the semiconductor device described in paragraph [10], the predetermined controlled circuit may comprise a slave interface circuit (1031) which is slave-interface operated with respect to an external device (1121).

If attention is paid to the slave interface circuit as a predetermined controlled circuit, then the slave interface circuit can be released from its low power consumption state and operated according to the needs of an external device like a master device which when the external device obtains access to the slave interface circuit which has been set to the low power consumption state by the central processing unit.

[13] <Interrupt Controller>

The semiconductor device described in paragraph [12] includes an interrupt controller (1060) which causes the power and clock control circuits to resume the supply of power and clocks to the central processing unit whose supply has been stopped, in response to an interrupt request (1403) received at a second external input terminal (1402).

The release of the low power consumption state of the central processing unit that controls the supply and stop of the power and clocks to itself can be carried out by the external interrupt request.

[14] <Data Processing System>

A data processing system according to a further embodiment of the present invention includes the semiconductor device described in paragraph [13], the slave interface circuit (1031) included in the semiconductor device, and the external device (1121) coupled to the first external terminal and the second external terminal.

[15] <Predetermined Controlled Circuits>

In the semiconductor device described in paragraph [10], the predetermined controlled circuits may include a first controlled circuit (1031) controlled from the outside of the semiconductor device and a second controlled circuit (1011) controlled by the first controlled circuit.

When the first controlled circuit has been set to a low power consumption state and is controlled from the outside of the semiconductor device by the central processing unit along with the second controlled circuit, the low power consumption states of the first controlled circuit and the second controlled circuit are released according to the external need, thereby making it possible to operate the first controlled circuit from outside and operate the second controlled circuit by the operated first controlled circuit.

[16] <Slave Interface and Memory Interface>

In the semiconductor device described in paragraph [15], the first controlled circuit may comprise a slave interface circuit (1031) slave-interface operated by an external data processing device. The second controlled circuit may comprise a memory interface circuit (1011) controlled by the slave interface circuit and the central processing unit.

Attention is focused on a slave interface circuit and a memory interface circuit as predetermined controlled circuits. When an external device like a master device controls the slave interface circuit which has been set to a low power consumption state along with the memory interface circuit by the central processing unit, and the external device wishes access to an external memory or the like coupled to the memory interface circuit, the low power consumption states of the slave interface circuit and the memory interface circuit are released memory interface circuit through the slave interface circuit.

[17] <Interrupt Controller>

The semiconductor device described in paragraph [16] includes an interrupt controller (1060) which causes the power and clock control circuits to resume the supply of power and clocks to the central processing unit whose supply has been stopped, in response to an interrupt request (1403) received at a second external input terminal (1402).

The release of the low power consumption state of the central processing unit that controls the supply and stop of the power and clocks to itself can be carried out by the external interrupt request.

[18] <Data Processing System>

A data processing system according to yet another embodiment of the present invention includes the semiconductor device (1001) described in paragraph [17], the slave interface circuit included in the semiconductor device, the external data processing device (1121) coupled to the first external terminal and the second external terminal, and an external memory device (1120) coupled to the memory interface circuit.

[19] <Slave Interface Circuit and Internal Memory>

In the semiconductor device described in paragraph [15], the first controlled circuit may comprise a slave interface circuit (1031) slave-interface operated by its corresponding external data processing device. The second controlled circuit may comprise an internal memory (2011) controlled by the slave interface circuit and the central processing unit. Attention is focused on a slave interface circuit and an internal memory as predetermined controlled circuits. When an external device like a master device is the requesting circuit and controls the slave interface circuit which has been set to a low power consumption state along with the internal memory by the central processing unit, and the external device wishes access to the internal memory, the low power consumption states of the slave interface circuit and the internal memory are released according to the need of the external device, thereby making it possible to externally operate the internal memory through the slave interface circuit.

[20] <Interrupt Controller>

The semiconductor device described in paragraph [19] includes an interrupt controller (1060) which causes the power and clock control circuits to resume the supply of power and clocks to the central processing unit whose supply has been stopped, in response to an interrupt request (1403) received at a second external input terminal (1402).

The release of the low power consumption state of the central processing unit that controls the supply and stop of the power and clocks to itself can be carried out by the external interrupt request.

[21] <Data Processing System>

A data processing system according to a still further embodiment of the present invention includes the semiconductor device (2001) described in paragraph [20], the slave interface circuit included in the semiconductor device, and the external data processing device (1121) coupled to the first external terminal and the second external terminal respectively.

[22] <Forcible Release Control Circuit Based on Internal Signal>

A data processing system according to another aspect of the present invention includes (a) a central processing unit for controlling the setting and release of a low power consumption state and for executing instructions, (b) a plurality of controlled circuits subject to control of the setting and release of a low power consumption state, (c) a low power consumption control circuit which controls the setting and release of the low power consumption state to and from the central processing unit and the controlled circuits, based on the execution of an instruction by the central processing unit, and (d) a forcible release control circuit which forcibly releases a low power consumption state of a predetermined controlled circuit set by the low power consumption control circuit only during a period required by a request signal outputted from a requesting circuit. In this instance, the concept of setting and release of the low power consumption state replaces the stop and supply of the power and clocks in the semiconductor device described in the paragraph 1. Thus, this concept extends to controlling the voltage of a power supply and the frequency of each clock, as well as the stop and supply of power and each clock.

[23] <Forcible Release Control Circuit Based on External Signal>

A data processing system according to a further aspect of the present invention includes a central processing unit for controlling the setting and release of a low power consumption state and for executing instructions, (b) a plurality of controlled circuits each subject to control of the setting and release of a low power consumption state, (c) a low power consumption control circuit which controls the setting and release of the low power consumption state to and from the central processing unit and the controlled circuits, based on the execution of an instruction by the central processing unit, and (d) a forcible release control circuit which forcibly releases a low power consumption state of a predetermined controlled circuit set by the low power consumption control circuit only during a period required by a request signal received at a first external input terminal from a requesting circuit.

In this instance, the concept based on an aspect similar to paragraph [22] is extended to the semiconductor device described in paragraph [10].

2. Details of Embodiments

Preferred embodiments will further be described in detail.

[First Embodiment]

<<Overall Configuration of Microcomputer>>

A configuration of a microcomputer according to a first embodiment of the present invention is illustrated in FIG. 1. The microcomputer 1 is one example of a semiconductor device. Although not limited in particular, it is formed in a single semiconductor substrate like monocrystalline silicon by a complementary field-effect transistor manufacturing technology.

The microcomputer 1 has the function of controlling low power consumption by the stop and supply of power and clocks for each internal circuit block. The supply of power to the inside of the microcomputer 1 is performed by an internal power switch circuit 110, and the supply of each clock to the inside is performed by a clock pulse generator (CPG) 100. The internal power switch circuit 110 outputs (provides) internal power 301 through 307, and the clock pulse generator 100 outputs clocks 201 through 209.

The inside of the microcomputer 1 is divided into a plurality of power regions in which the stop (suspension) and supply (application) of power are individually controlled from the internal power switch circuit 110. The power regions include, for example, a sound-related IP power region 10 supplied with the power 304, an internal bus B1 power region 20A supplied with the power 305, an internal bus B2 and C power region 20B supplied with the power 306, a CPU peripheral circuit power region 30 supplied with the power 303, a CPU power region 40 supplied with the power 301, a multimedia power region 50 supplied with the power 302, and a normally power-on region supplied with the power 307, which is a region other than the above. Although the stop and supply of clock are controlled synchronously with the stop and supply of power to each power region, clock signals different in frequency or the like are partly supplied to the same power regions. Although not limited in particular, all of the internal power 301 through 307 may be the same power supply potential. The internal power may be configured by a combination of a first power supply potential supplied to one or more power regions and a second power supply potential different from the first power supply potential, supplied to the power regions other than those.

A CPU (Central Processing Unit) 41, which fetches each instruction, decodes the fetched instruction and executes it, is disposed in the CPU power region 40. The CPU 41 is supplied with the clock 201 and executes an instruction in sync with the clock 201.

An internal bus (B1) 25 coupled to the CPU 41 is disposed in the internal bus B1 power region 20A. The internal bus (B1) 25 is operated in sync with the clock 203.

The multimedia power region 50 includes an internal bus (A) 53 coupled to the internal bus (B1) 25 via a bus bridge 51. A multimedia CPU 52 coupled to the internal bus 53, and one or more multimedia modules 54 which are controlled by the multimedia CPU 52 coupled to the internal bus 53 and execute multimedia processing, are provided in the multimedia power region 50. Circuits for the multimedia power region 50 are operated in sync with the clock 302.

The internal bus B2 and C power region 20B includes an internal bus (B2) 21 coupled to the internal bus (B1) 25 via a bus bridge 24, and an internal bus (C) 23 coupled to the internal bus 21. A DRAM interface 22 is coupled to the internal bus 21. The internal bus (B2) 21 performs a transmission operation in sync with the clock 204, and the internal bus (C) 23 performs a transmission operation in sync with the clock 205. The DRAM interface 22 controls a memory operation of a synchronous DRAM (SDRAM) 121 disposed outside the microcomputer 1 in sync with the clock 206.

A signal processing unit (SPU) 12 and an audio interface 11 coupled to the internal bus 21, which perform signal processing for musical playback or reproduction, are provided in the sound-related IP power region 10. They are operated synchronously with the clock 208. The signal processing unit 12 has a memory 13, a direct memory access controller (DMAC) 14, and a digital signal processor (DSP) 15. The DMAC 14 transfers music data from the SDRAM 121 to the memory 13 through the DRAM interface 22 when the start of its data transfer is instructed by the DSP 15. The DSP 15 performs processing or the like for expanding the music data retained in the memory 13 to its reproducible predetermined format and transfers the same to the audio interface 11. An audio LSI 120, which is a semiconductor device provided with an audio amplifier or the like, is coupled to the audio interface 11 outside the microcomputer 1. The audio interface 11 supplies music data expanded in sync with a sampling rate from the audio LSI 120 to the signal processing unit 12.

One or more CPU peripheral circuits 32 are disposed in the CPU peripheral circuit power region 30 in addition to a memory card interface 31 and a timer, etc. respectively coupled to the internal bus 23. They are operated in sync with the clock 207. A memory card 122 is detachably coupled to the memory card interface 31 outside the microcomputer 1. The memory card interface 31 performs interface control for file access with the memory card 122 as a file memory in accordance with an access instruction issued from the CPU 41 or the like.

For example, when the memory card 122 holds music data therein, the CPU 41 reads the music data via the internal bus 23 from the memory card 122 through the memory card interface 31 (data path DPS1), and stores the read music data in the SDRAM 121 using the DRAM interface 22 via the buses 25 and 21 (data path DPS2). The music data stored in the SDRAM 121 are temporarily sequentially stored in the memory 13 by transfer control by the DMAC 14 (data path DPS3). The stored music data are read by the DSP 15 and targeted for digital signal processing such as decompression processing (data path DPS4). The decompressed music data are supplied to the audio LSI 120 via the audio interface 11 (data path DPS5).

Although not limited in particular, an interrupt controller 60, a forcible release control circuit 70, a clock control circuit 80 and an internal power control circuit 90, etc. are disposed in the normally power-on region (which area is always supplied with the power while the microcomputer 1 is being supplied with the power from outside of the microcomputer) supplied with the power 307 in addition to the clock pulse generator 100 and the internal power switch circuit 110. Circuits for the normally power-on region are supplied with the normally-operating clock 209. Each circuit disposed outside the normally power-on region is an example of a controlled circuit subject to control of the stop and supply of each clock and power.

The clock pulse generator 100 is supplied with an external clock EXCLK received at an external terminal after an original oscillation generated from a clock oscillator 123 disposed outside the microcomputer 1 has been subjected to division processing by a high frequency device (RFIC). A phase-locked loop (PLL) 111 generates an internal clock synchronized with the external clock EXCLK, which is divided by a divider 112. The so-divided various clocks are supplied to their corresponding regions and parts as the clocks 201 through 208 through a stop control switch circuit 113. One clock outputted from the divider 112 or a real time clock supplied from a real time clock 125 disposed outside the microcomputer 1 is selected by a selector 114, which in turn is supplied to the circuits for the normally power-on region as the normally-operating clock 209. Although not limited in particular, the internal clocks 201 through 208 may respectively be different frequencies. For example, the CPU clock 201 may be at a high speed, the internal bus clocks 203 and 204 and the DRAM I/F clock 206 may be at a middle speed, and the internal bus clock 205 and CPU peripheral clock 207 may be at a low speed, respectively. Frequencies by combinations other than the above may be adopted.

The clock control circuit 80 controls the stop and supply of the clocks 201 through 208 by the clock pulse generator 100.

The internal power control circuit 90 controls the stop and supply of the power 301 through 306 by the internal power switch circuit 110.

The forcible release control circuit 70 performs control for causing the clock pulse generator 100 and the internal power switch circuit 110 to temporarily resume the supply of the clocks and power to a predetermined internal circuit (which is one of the controlled circuits) whose supply has previously been stopped by the control of the CPU 41. The supply of the clocks and power is resumed to the predetermined internal circuit in accordance with a request issued from one of the other internal circuits (sometime referred to herein as a "requesting circuit" or "requesting controlled circuit") with respect to the predetermined internal circuit. Thereafter, the supply of the clocks and power is again stopped in response to a request's negation, such as when the request signal has ended. In the present embodiment, the state of stopping of the supply of the clocks and power is also referred to as a low power consumption state.

In the present embodiment, the requesting circuit is assumed to be DSP 15 and the predetermined internal circuits are assumed to be the circuits for the internal bus B2 and C power region 20B (DRAM controller 22, internal bus 21, bus bridge 24 and internal bus 23) in order to facilitate the understanding thereof.

Designated at numeral 400 is a request signal (clock/power request signal) outputted by the DSP 15 for allowing the DSP 15 to forcibly release the low power consumption state relative to the circuits for the internal bus B2 and C power region 20B.

Designated at numeral 401 is a state signal (clock/power state signal) outputted by the forcible release control circuit 70 for notifying the DSP 15 about the low power consumption state relative to the circuits for the internal bus B2 and C power region 20B.

Designated at numeral 405 is a control signal outputted by the forcible release control circuit 70 to the clock control circuit 80 for the forcible release and reset of the low power consumption state relative to the circuits for the internal bus B2 and C power region 20B.

Designated at numeral 407 is a control signal (LSI internal power request signal) outputted by the forcible release control circuit 70 to the internal power control circuit 90 for the forcible release and reset of the low power consumption state relative to the circuits for the internal bus B2 and C power region 20B.

Designated at numeral 404 is a state signal outputted by the clock control circuit 80 to the forcible release control circuit 70 for notifying the state of the clock at each of the circuits for the internal bus B2 and C power region 20B.

Designated at numeral 406 is a state signal (LSI internal power state signal) outputted by the internal power control circuit 90 to the forcible release control circuit 70 for notifying the state of the power at each of the circuits for the internal bus B2 and C power region 20B.

Control on the forcible release and reset of the low power consumption state will be explained in detail on the premise of these.

<<Control on the Forcible Release and Reset of Low Power Consumption State>>

Figure 2:
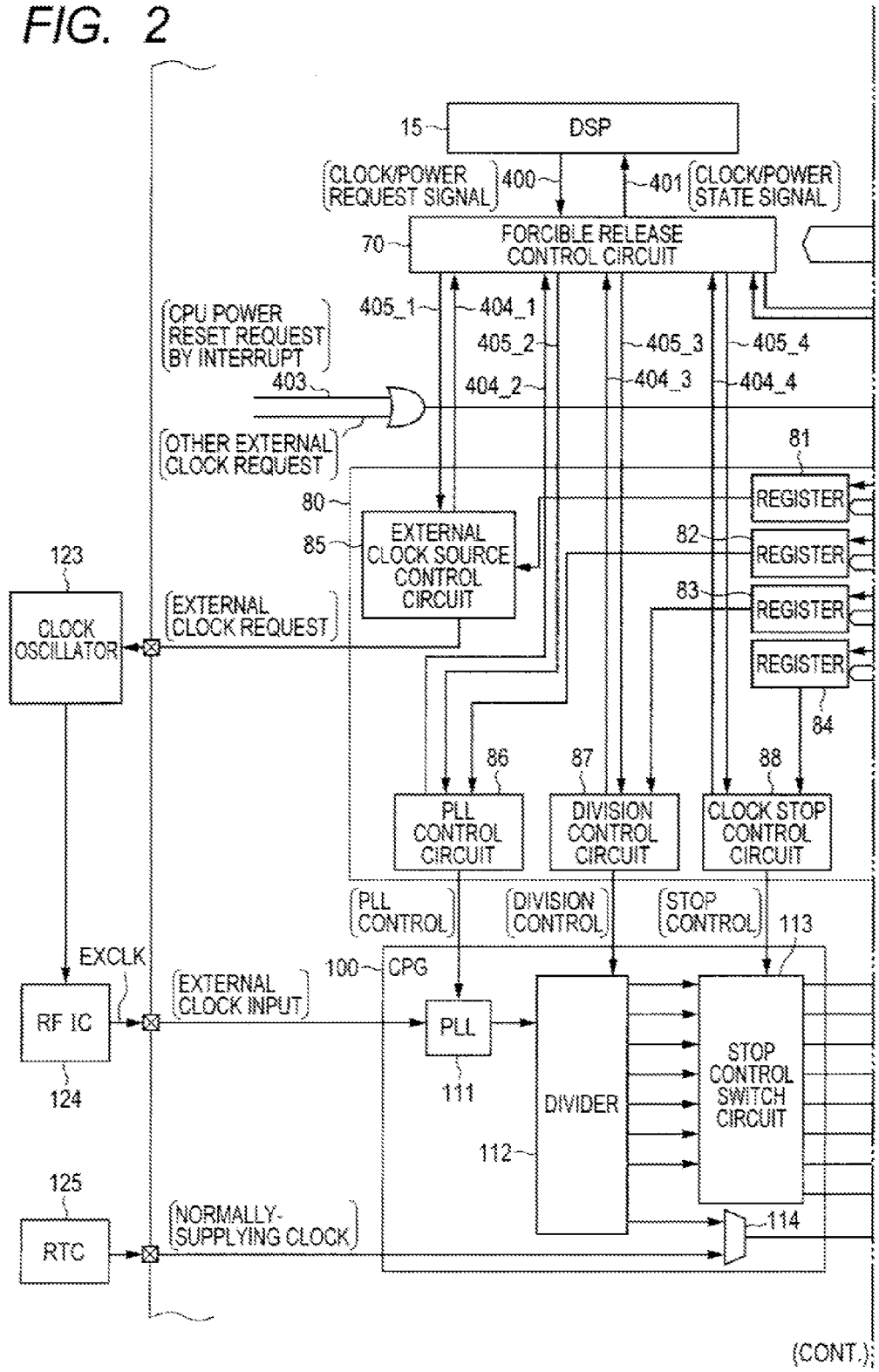
FIG. 2 is a block diagram illustrating a detailed configuration of low power consumption control of the microcomputer shown in FIG. 1.

A detailed configuration of low power consumption control at the microcomputer 1 is illustrated in FIG. 2.

The clock control circuit 80 has registers 81 through 84 to which control data for controlling the stop and supply of each clock can be set by the CPU 41 through the internal bus 23.

The register 81 supplies the control data to an external clock source control circuit 85. The external clock source control circuit 85 controls the stop and operation of a clock oscillator 123 in accordance with the value of the control data. A determination as to whether the oscillation of the clock oscillator 123 is stable is given to the forcible release control circuit 70 by a state signal 404_1 outputted from the external clock source control circuit 85.

The register 82 supplies control data to a PLL control circuit 86, which controls the stop and operation of a PLL 111 in accordance with the value of the control data. The PLL control circuit 86 determines whether the operation of the PLL 111 is stable, and provides this information to the forcible release control circuit 70 by a state signal 404_2.

The register 83 has control data for determining division ratios between the clocks 201 through 208. The division-ratio determination control data are supplied to a division control circuit 87, which controls the division ratios between the clocks 201 through 208 in accordance with the division ratio control data. The division control circuit 87 determines whether the division of the clocks 204 through 206 to the circuits for the internal bus B2 and C power region 20B is stopped, and provides this information to the forcible release control circuit 70 by a state signal 404_3.

The register 84 has control data for determining the stop or supply of the clocks 201 through 207. The stop/supply control data are given to a clock stop control circuit 88, which individually controls the stop or supply of the clocks 201 through 207 in accordance with the stop/supply control data. The clock stop control circuit 88 determines whether the supply/stop of the clocks 204 through 206 to the circuits for the internal bus B2 and C power region 20B is done, and provides this information to the forcible release control circuit 70 by a state signal 404_4.

The internal power control circuit 90 has a register 91 to which control data for controlling the stop and supply of power can be set by the CPU 41 via the corresponding internal bus. The register 91 has control data for determining the stop or supply of respective power 301 through 306. The stop/supply control data are given to a power control circuit 92, which individually controls the stop or supply of the respective power 301 through 306 in accordance with the stop/supply control data. The power control circuit 92 determines whether the supply of the power 306 to the internal bus B2 and C power region 20B is stable, and provides this information to the forcible release control circuit 70 by a state signal 406.

As is apparent from the description made up to now, the supply and stop of the power and clocks can arbitrarily be set according to the operation of writing to the registers 81 through 84 and the register 91 by the execution of a corresponding instruction by the CPU 41. The CPU 41 itself also executes, for example, a standby instruction and finally enables its own control bit for stopping the clocks and power to thereby allow a transition to a low power consumption state.

The restoration of the CPU 41 from the low power consumption state is done in the following manner When an interrupt request is inputted to the interrupt controller 60, the interrupt controller 60 outputs an interrupt signal to the CPU 41 in response to the interrupt request and activates a reset request signal 403 to initialize CPU 41 corresponding bits at the registers 81 through 84 and 91 into a supply enable state, thereby making it possible to resume the operation of supplying the power and clocks to the CPU 41.

The state of the once-set supply/stop of power and clocks can be released by rewriting the corresponding bit of the corresponding registers 81 through 84 or register 91. In the present embodiment in particular, the release and reset using the forcible release control circuit 70 are enabled. This will be explained in detail below.

The forcible release control circuit 70 refers to all the state signals 404_1 through 404_4 and 406 and inactivates the state signal 401 when any of the clocks 204 through 206 and power 306 to the circuits for the internal bus B2 and C power region 20B is at a supply stop, and notifies its state to the DSP 15.

When the DSP 15 needs the operation of the corresponding circuits for the internal bus B2 and C power region 20B to conduct signal processing, the DSP 15 refers to the state signal 401. If the state signal 410 has been activated, the DSP 15 starts the process of acquiring necessary data from the SDRAM 121 via the DRAM interface 22. On the other hand, if the state signal 401 is in inactivation, the DSP 15 activates the request signal 400 for forcibly releasing the low power consumption state and supplies it to the forcible release control circuit 70. The forcible release control circuit 70 activates the request signals 405_1 through 405_4 and 407 in response to the request signal 400 and gives the same to the clock control circuit 80 and the internal power control circuit 90.

The external clock source control circuit 85 which receives the request signal 405_1 therein, performs control for forcibly starting an oscillating operation of the clock oscillator 123 during a period for activation of the request signal 405_1 even though the corresponding control bit of the register 81 indicates the stop of oscillation of the clock oscillator 123.

The PLL control circuit 86 which accepts the request signal 405_2 therein, performs control for forcibly starting the operation of the PLL 111 during a period for activation of the request signal 405_2 even though the corresponding control bit of the register 82 indicates the stop of a PLL operation.

The division control circuit 87 which receives the request signal 405_3 therein, performs control for forcibly starting the operation of division of the clocks 204 through 206 during a period for activation of the request signal 405_3 even though the corresponding clock control bits for the cocks 204 through 206 at the register 83 indicate the stop of their division.

The clock stop control circuit 88 which receives the request signal 405_4 therein performs control for forcibly starting the operation of supply of the corresponding clocks 204 through 206 during a period for activation of the request signal 405_4 even if the corresponding control bits for the clocks 204 through 206 at the register 84 indicate the supply/stop of the clocks.

The power control circuit 92 which receives the request signal 407 therein, performs control for forcibly starting the supply operation of the power 306 during a period for activation of the request signal 407 even if the corresponding power control bit for the power 306 at the register 91 indicates the supply/stop of power.

The forcible release control circuit 70 activates the state signal 401 only after all the state signals 404_1 through 404_4 and 406 have been brought to a state indicative of stabilization of the clocks and power. After waiting for the state signal 401, the DSP 15 starts an operation using each of the circuits for the internal bus B2 and C power region 20B.

Incidentally, although not limited in particular, the stabilization of the oscillating operation of the clock oscillator 123 and the stabilization of oscillation of the PLL 111 can be discriminated by sampling oscillating states by the external clock source control circuit 85 and the PLL control circuit 86 or discriminated in wait for stabilizing time by a timer operation.

Figure 3:
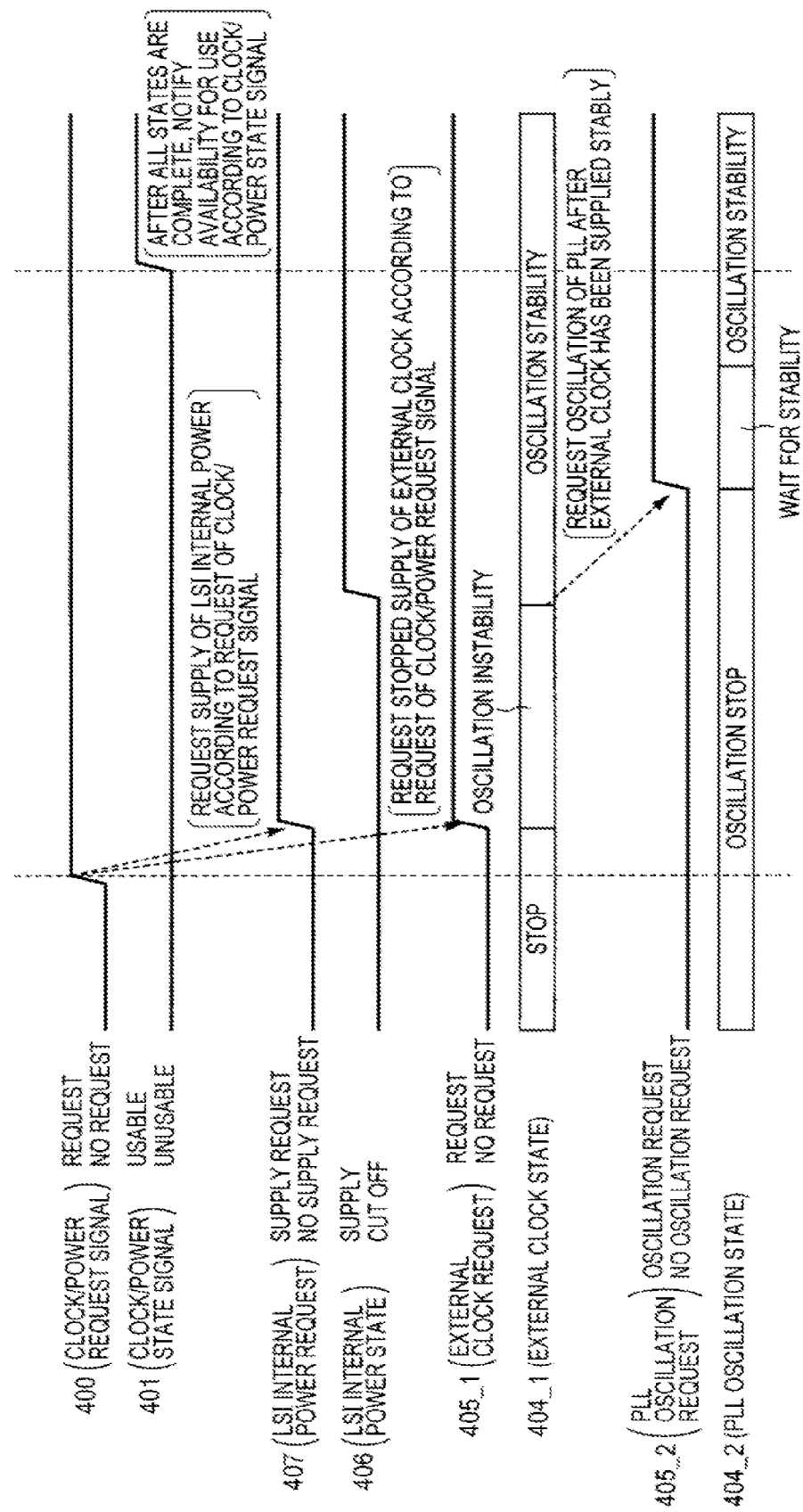
FIG. 3 is a timing chart illustrating operating timings provided to forcibly release the supply and stop of power and clocks.

Operating timings provided to forcibly release the supply and stop of power and clocks are illustrated in FIG. 3. FIG. 3 shows a case in which when both of the power and clocks are cut off, they are forcibly released. As is apparent from this figure, when a release request is made by the signal 400, the power 306 is stabilized, the external clock EXCLK is stabilized, and the oscillation of the PLL is stabilized, followed by activation of the state signal 401. Thus, the DSP 15 starts to access the SDRAM 121 using the circuits for the internal bus B2 and C power region 20B only after having received the activated state signal 401.

Figure 4:
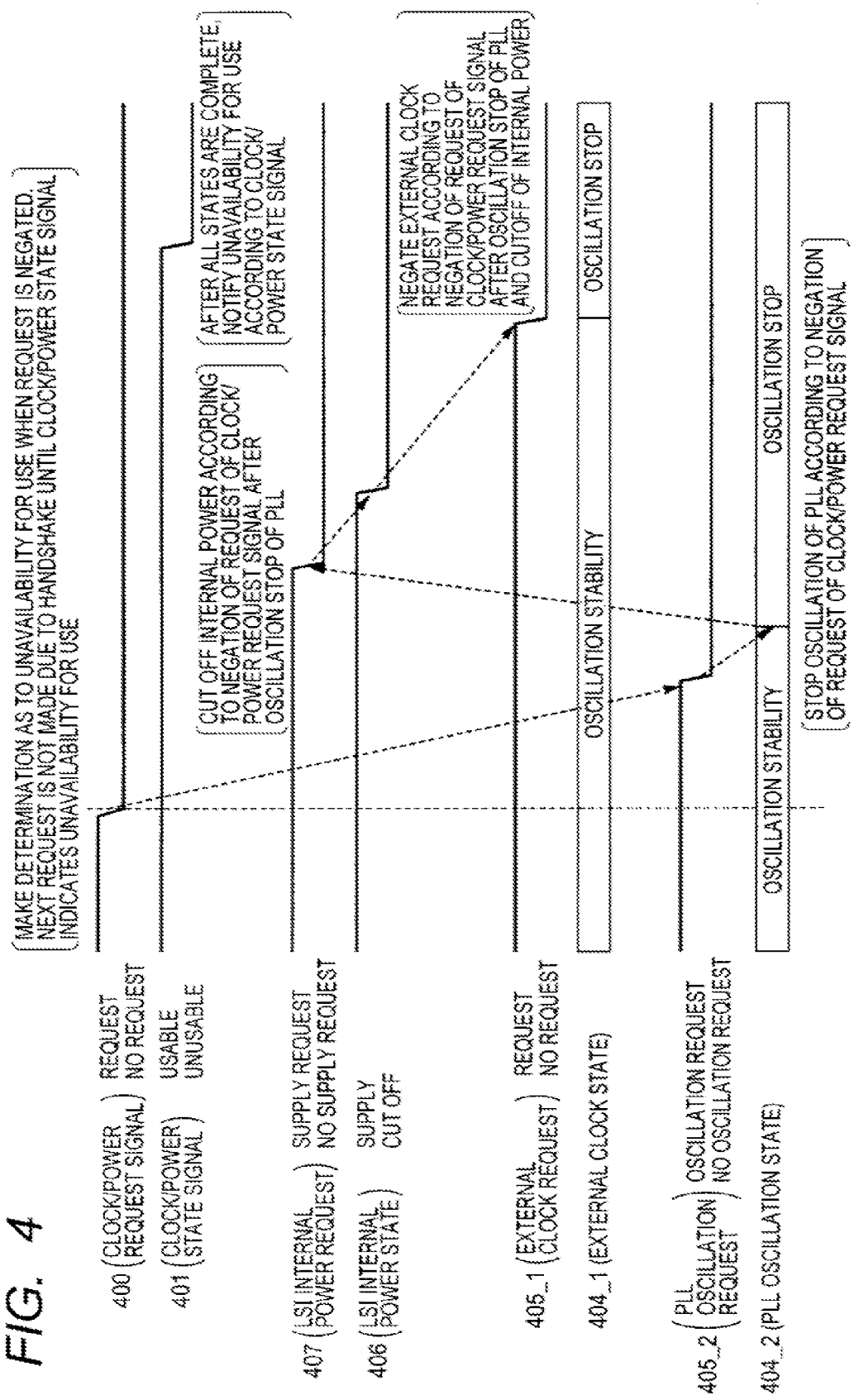
FIG. 4 is a timing chart illustrating operating timings provided to restore the supply and stop of the power and clocks from their forcibly-released states.

Operating timings provided to restore the supply and stop of the power and clocks from their forcibly-released states are illustrated in FIG. 4. FIG. 4 shows a case in which both of the power and clocks are restored to their cutoff states. As is apparent from this figure, when a release request from the DSP 15 is negated by the signal 400, the oscillation of the PLL 111 is stopped and the power 306 is then cut off. Further, after the oscillation of the clock oscillator 123 has been stopped, the state signal 401 is inactivated. After the clock stop, power shutdown is done, whereby the occurrence of a malfunction is avoided upon restoring to the power and clock stop states.

<<Music Data Reproducing Process>>

Figure 5:
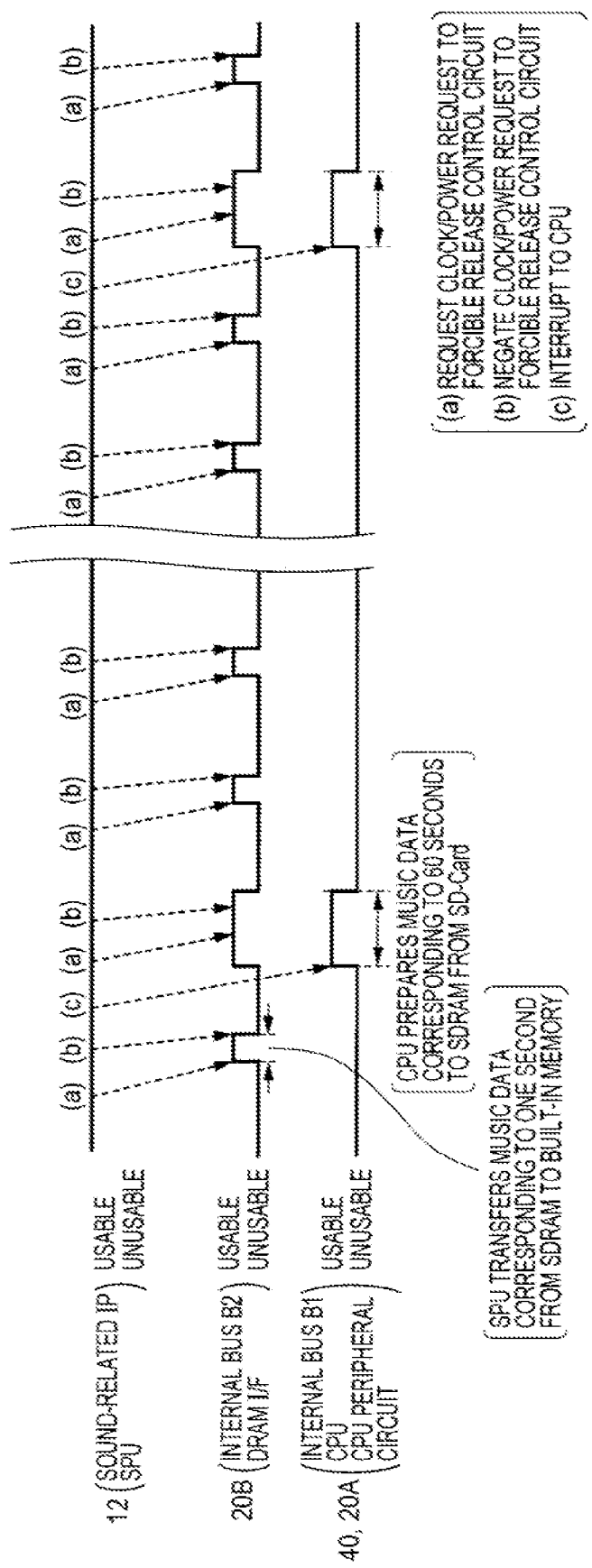
FIG. 5 is an overall timing chart of music data reproducing processing by the microcomputer shown in FIG. 1.

An overall timing chart of music data reproducing processing by the microcomputer 1 is shown in FIG. 5.

Figure 7:
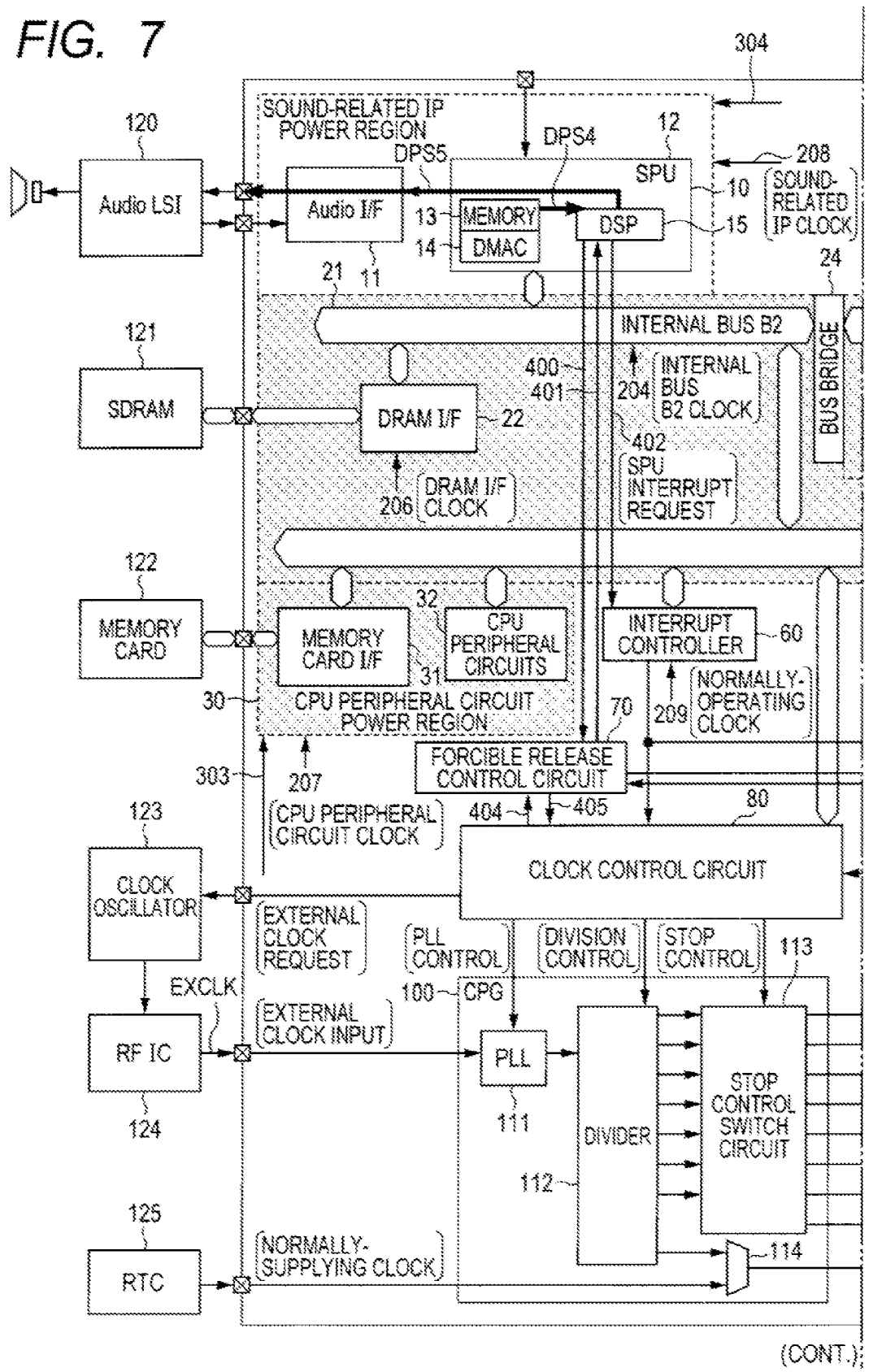
FIG. 7 is a block diagram showing a state of the supply of power and clocks to power regions 40, 20A, 20B and 30 in the microcomputer shown in FIG. 1.

The SPU 12 performs a process for reproducing or playing back music data in the memory 13 (first memory) and outputs it to the outside from the audio interface 11. The operating clock 208 for the SPU 12 and audio interface 11 is different from the clock for the overall system. Even though the main clocks for the microcomputer 1 stop, the SPU 12 can continue to operate. The power to a power region for each circuit unnecessary for playing back music data is shut down. Thus, power consumption during musical playback is reduced. As illustrated in FIG. 7, for example, the supply of power and clocks to the power regions 40, 20A, 20B and 30 is stopped. In FIG. 7, the shaded regions indicate regions in which the supply of power and clocks is stopped.

Figure 8:
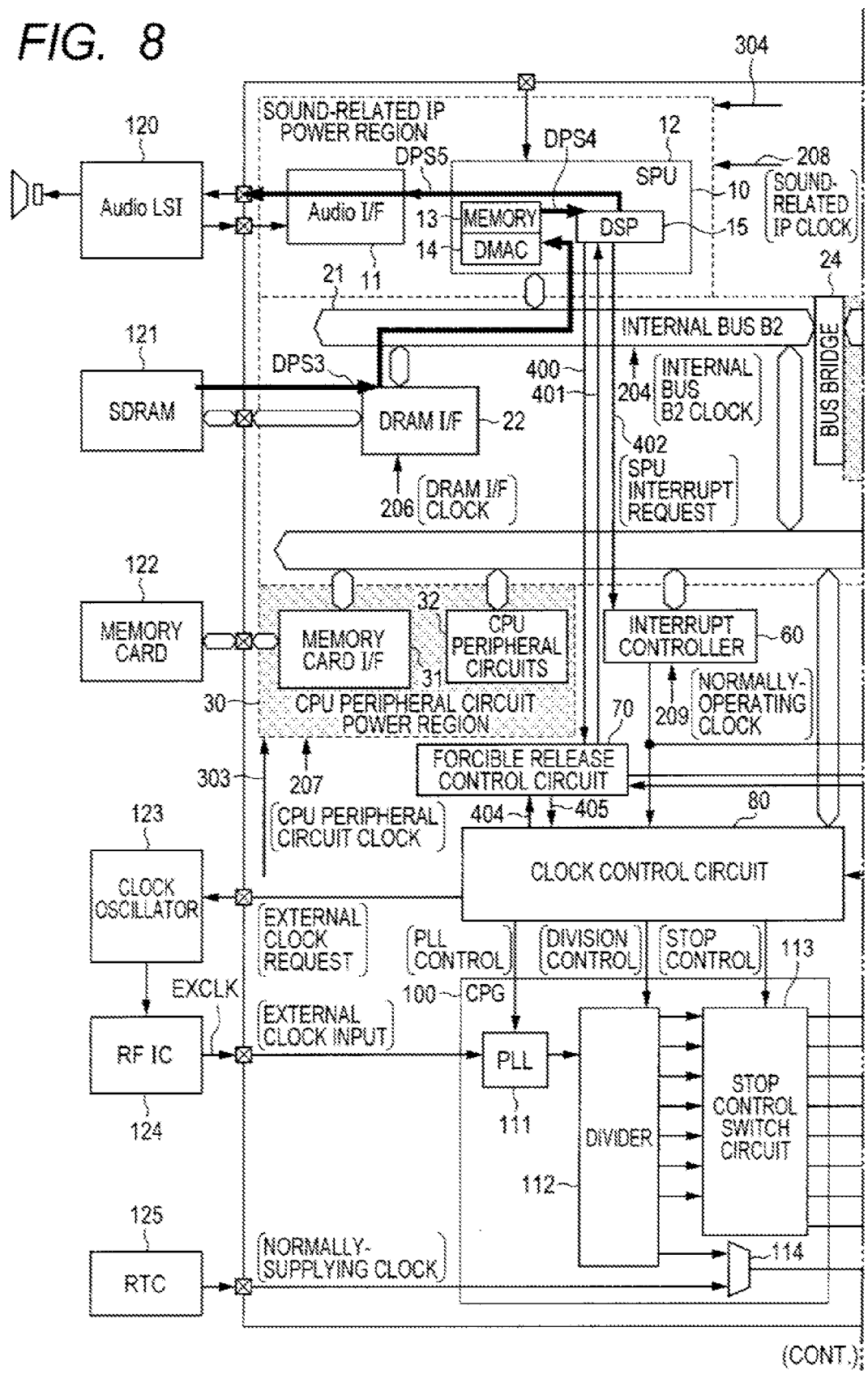
FIG. 8 is a block diagram illustrating a state of the operation of transferring music data held in an SDRAM 121 to a memory 13 using a DMAC 14 in the microcomputer shown in FIG. 1.

When the remaining music data in the memory 13 (first memory) reaches a predetermined amount or less, the SPU 12 having DSP 15 and functioning as a requesting circuit, asserts the signal 400 to the forcible release control circuit 70 and makes a request for the release of the state of the supply/stop of the clocks and power (timing "a" in FIG. 5). The forcible release control circuit 70 having received the request therein releases the stop of the clocks 204 and 206 and releases the supply/stop of the power 306 to enable the operation of the minimum resources required for the SPU 12 to access the SDRAM 121 (second memory), for example, the internal bus 21 and the DRAM interface 22, thereby bringing the clocks and power to their supply states. Thus, the internal bus B2 21 and the DRAM interface 22, which belong to power region 20B and can be considered to belong to a first controlled circuit assembly, are released from a low power consumption state and enabled for access by the SPU 12. When the use of the internal bus 21 and the DRAM interface 22 is enabled, the SPU 12 transfers the music data held in the SDRAM 121 to the memory 13 using the DMAC 14 (here, the SPU 12 transfers music data corresponding to one second from the SDRAM 121 to the memory 13). Operating states at this time are illustrated in FIG. 8.

After the completion of the transfer of the data to the memory 13, the SPU 12 negates the request signal 400 with respect to the forcible release control circuit 70. Consequently, the forcible release control circuit 70 resumes the supply/stop of the clocks 204 and 206 and the supply/stop of the power (internal bus B2 and C power) 306 and is again returned to the first low power consumption state, as shown in FIG. 7 (timing "b" in FIG. 5). Detailed operating timings taken during periods of the timings "a" and "b" shown in FIG. 5 are illustrated in FIG. 6.

Figure 9:
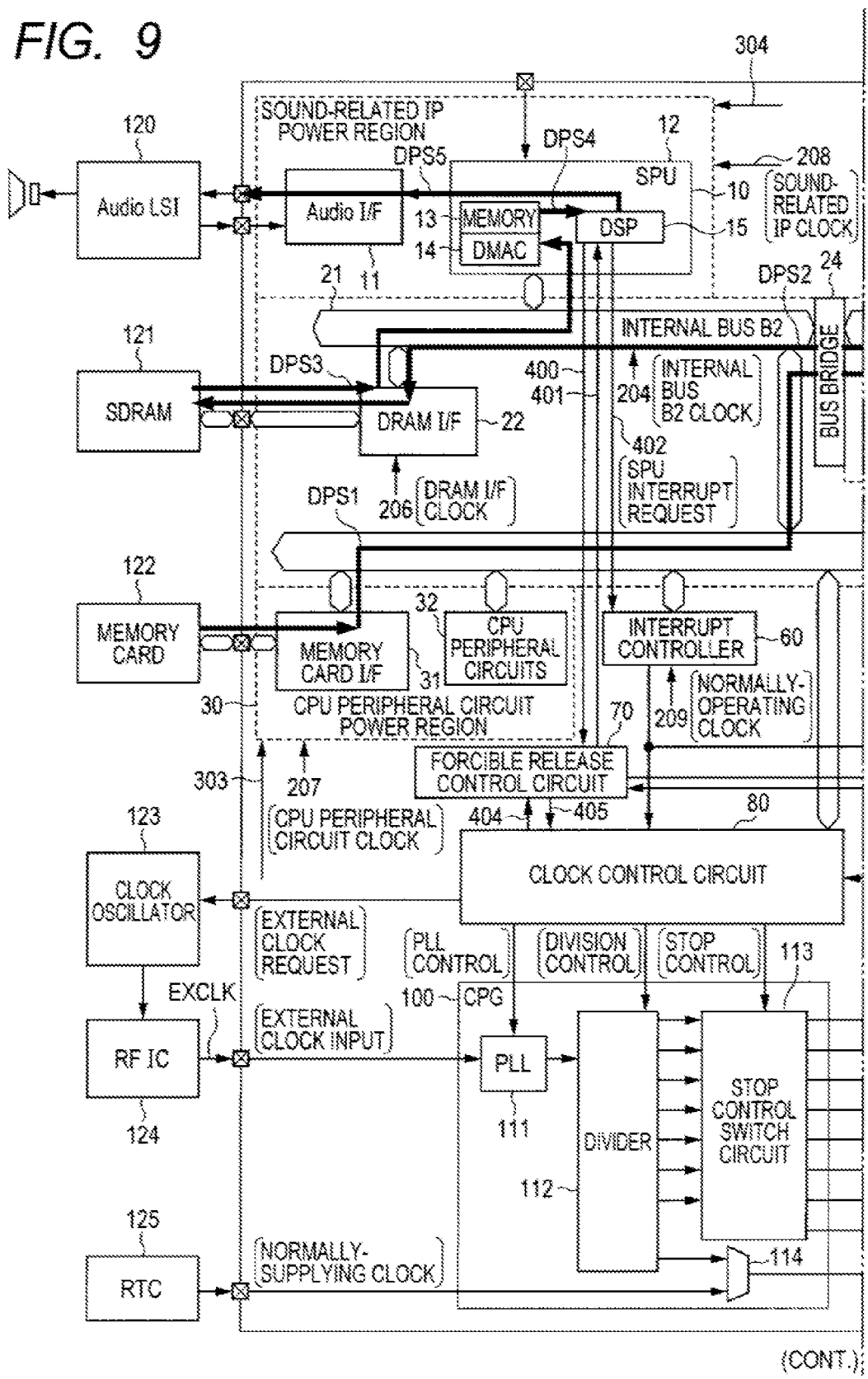
FIG. 9 is a block diagram showing a state of the operation of reading music data from a memory card 122 via a memory card interface 31 to develop it into the SDRAM 121 before the music data on the SDRAM 121 disappears in the microcomputer shown in FIG. 1.

While the operations of the timings "a" and "b" in FIG. 5 are repeated, the SPU 12 issues the interrupt request 402 to the interrupt controller 60 for each predetermined time in the course of their operations, and the interrupt controller 60 that receives the interrupt request therein activates the reset request signal 403 to resume the supply of the clock 201 to the CPU power region 40 and the supply of the power 301 thereto as shown in FIG. 9, thereby restoring the CPU 41 to its operable state. The so-processed CPU 41 executes an interrupt processing program responsive to the interrupt request 402 to thereby perform the operation of reading music data from the memory card 122 (third memory) via the memory card interface 31 and expanding it to the SDRAM 121 before the music data on the SDRAM 121 disappears (timing "c" in FIG. 5) (in this embodiment, the CPU 41 reads music data corresponding to 60 seconds from the memory card 122 and transfers it to the SDRAM 121). In this case, the memory card interface 31 in power region 30 and the internal bus B1 25 in power region 20A, may together be considered to belong to a second controlled circuit assembly which is accessed by the CPU 41. It is noted, however, that the CPU 41 and the memory card interface 31 must also access elements belonging the first controlled circuit assembly, especially the DRAM interface 22, to transfer data read from the memory card 122 to the SDRAM 121, as shown in FIG. 9.

Thus, when only the operation of the SPU 12 becomes necessary upon the need for music data at the SPU 12 and the like, each circuit necessary for the SPU operation is brought to an operating state, i.e., the DRAM I/F 22 and the internal bus B2 (belonging to the first controlled circuit assembly) are respectively brought to an operating state by supplying the clocks 204 and 206 and the power 306. Thereafter, when the CPU 41 requires access to (a) the second controlled circuit assembly to communicate with the memory card interface 31 and the memory card 122, and also (b) the first controlled circuit assembly to communicate with the DRAM interface 22, even though the operation of the SPU 12 is completed, the supply of the clocks 204 and 206 and the power 306 is maintained continuously. Namely, it is possible to maintain the supply of the clocks and power to the DRAM I/F 22 and the internal bus B2 during a required period by arbitration control of the forcible release control circuit 70, the clock control circuit 80 and the internal power control circuit 90. It is thus possible to optimize the clock/power supply and achieve low power consumption by bringing each internal circuit necessary only during the required period to the operating state.

Thus, if the CPU 41 is restored to the operable state pursuant to an interrupt request while the SPU 12 is accessing the first controlled circuit assembly, the forcible release control circuit 70 does not resume the low power consumption state of the first controlled circuit assembly even after the SPU 12 has finished access thereto, since the CPU 41 still requires access to the first controlled circuit assembly. This allows the CPU 41 to access both the first controlled circuit assembly and the second controlled circuit assembly at the same time, to thereby effect the transfer of data from the memory card 122 (third memory) via the memory interface card 31 to the SDRAM 121 (second memory).

In the above description, it can be seen that a given controlled circuit assembly may comprise one or more controlled circuits, each having separate supply of the clocks and power. Also, while in the embodiment described above, the first controlled circuit assembly and the second controlled circuit assembly are disjoint and have no controlled circuits in common, in other embodiments, they may have overlapping controlled circuits.

According to the first embodiment, the following operative effects are brought about.

(1) It is not necessary to interpose the CPU 41 when the CPU 41 itself forcibly releases the state of stop of the power and clocks set to the circuits for the internal bus power region B2 and C region 20. There is therefore no need to restore the CPU 41 to its operable state upon forcibly releasing the low power consumption state of each of other internal circuits in the low power consumption state of the CPU 41. This can contribute to low power consumption of the microcomputer 1 and the shortening of its processing time in this regard.

(2) If the request for the supply of the power and clocks from the DSP 51 having requested the forcible release is ended, then the CPU 41 is restored to the low power consumption state. In brief, since the operation relative to each of the registers 81 through 84 and 91 is not performed as in the case of the restoration of the CPU 41 from the standby state by the interrupt request, the CPU 41 can simply be returned to the low power consumption state previously set by the execution of an instruction by the CPU 41 if the forcible release request is negated. Accordingly, control for defining a relationship between the forcible release and resetting relative to the state of stop of the power and clocks previously set by the execution of the instruction by the CPU 41 becomes simple.

(3) The forcible release control circuit 70 receives the state signals 404_1 through 404_4 and 406 each indicative of the state of the supply and stop of the power and clocks from the clock control circuit 80 and the internal power control circuit 90. The forcible release control circuit 70 notifies a release timing for the supply/stop of the power and clocks to the DSP 15 in accordance with the signal 401 by referring to the received state signals, and notifies a reset timing to each of the clock control circuit 80 and the internal power control circuit 90 in accordance with each of the signals 405_1 through 405_4 and 407. Therefore, after the stabilization of the clocks and power by the forcible release, the DSP 15 can stably operate and use each circuit in which the supply/stop of the clocks and power is released. When the stop of the supply of the clocks and power is resumed, a malfunction in the corresponding resumed target circuit can reliably be suppressed. In brief, timing control on the release and reset can appropriately be performed by means of a handshake.

(4) The SPU 12 issues the interrupt request 402 to the interrupt controller 60. In response, the interrupt controller 60 activates the reset request signal 403 and resumes the supply of the clock 201 to the CPU power region 40 and the supply of the power 301 thereto, thereby making it possible to restore the CPU 41 to its operable state. In brief, the release of the low power consumption state of the central processing unit 41 that controls the supply/stop of the power and clocks to itself can be performed with the interrupt request.

(5) The sound-related IP power region 10 includes the DMAC 14, the memory 13 and the DSP 15, and the power region 20B includes the DRAM interface accessed thereby. Therefore, before or when data to be processed is lost, the DSP 15 releases the low power consumption state of the power region 20B and is supplied with necessary data. After the acquisition of the data, the DSP 15 can restore the power region 20B to the low power consumption state.

(6) The CPU peripheral circuit power region 30 includes the memory card interface 31 for expanding the data of the memory card 122 to the SDRAM 121 by the control of the CPU 41. Therefore, before or when the data supplied to the DSP 15 is lost on the SDRAM 121, the DSP 15 issues the interrupt request 402 to the CPU 41. Consequently, the CPU 41 can transfer data captured from the memory card interface 31 to the SDRAM 121.

[Second Embodiment]

Figure 10:
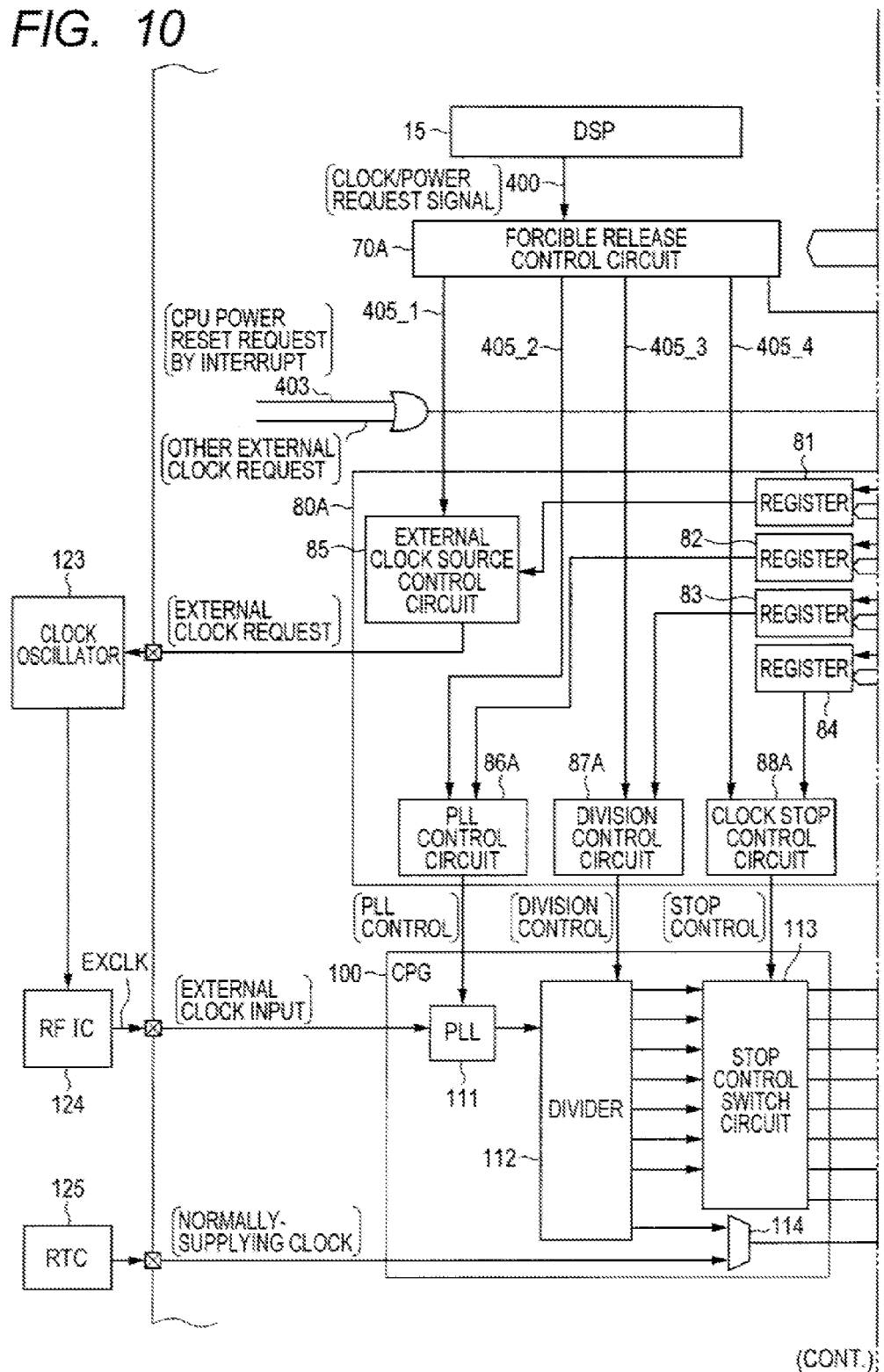
FIG. 10 is a block diagram illustrating part of a microcomputer according to a second embodiment of the present invention.

FIG. 10 illustrates part of a microcomputer according to a second embodiment of the present invention. The second embodiment differs from the first embodiment in that the state signals 401, 404_1 through 404_4 and 406 shown in FIG. 3 are eliminated and instead a forcible release control circuit 70A uses a timer to control the release timing for the supply/stop of the power and clocks and the reset timing from the release of the supply/stop thereof. A clock control circuit 80A includes circuits 86A, 87A and 88A which do not include the function of outputting the state signals 401 and 404_1 through 404_4, and a power control circuit 90A includes a circuit 92A which does not include the function of outputting the signal 406.

It is desirable that the timer is provided exclusively for the forcible release control circuit 70A. When the timer being one peripheral circuit of a CPU is used, power and a clock must be supplied to the corresponding peripheral circuit as occasion requires. The second embodiment is otherwise the same as the first embodiment, and the same reference numerals are respectively attached to the same components. Their detailed explanations will therefore be omitted.

According to the above, the signals for capturing the states for the purpose of timing control can be made unnecessary. Otherwise, the same operative effects as those in the first embodiment are brought about.

[Third Embodiment]

<<Overall Configuration of Microcomputer>>

Figure 11:
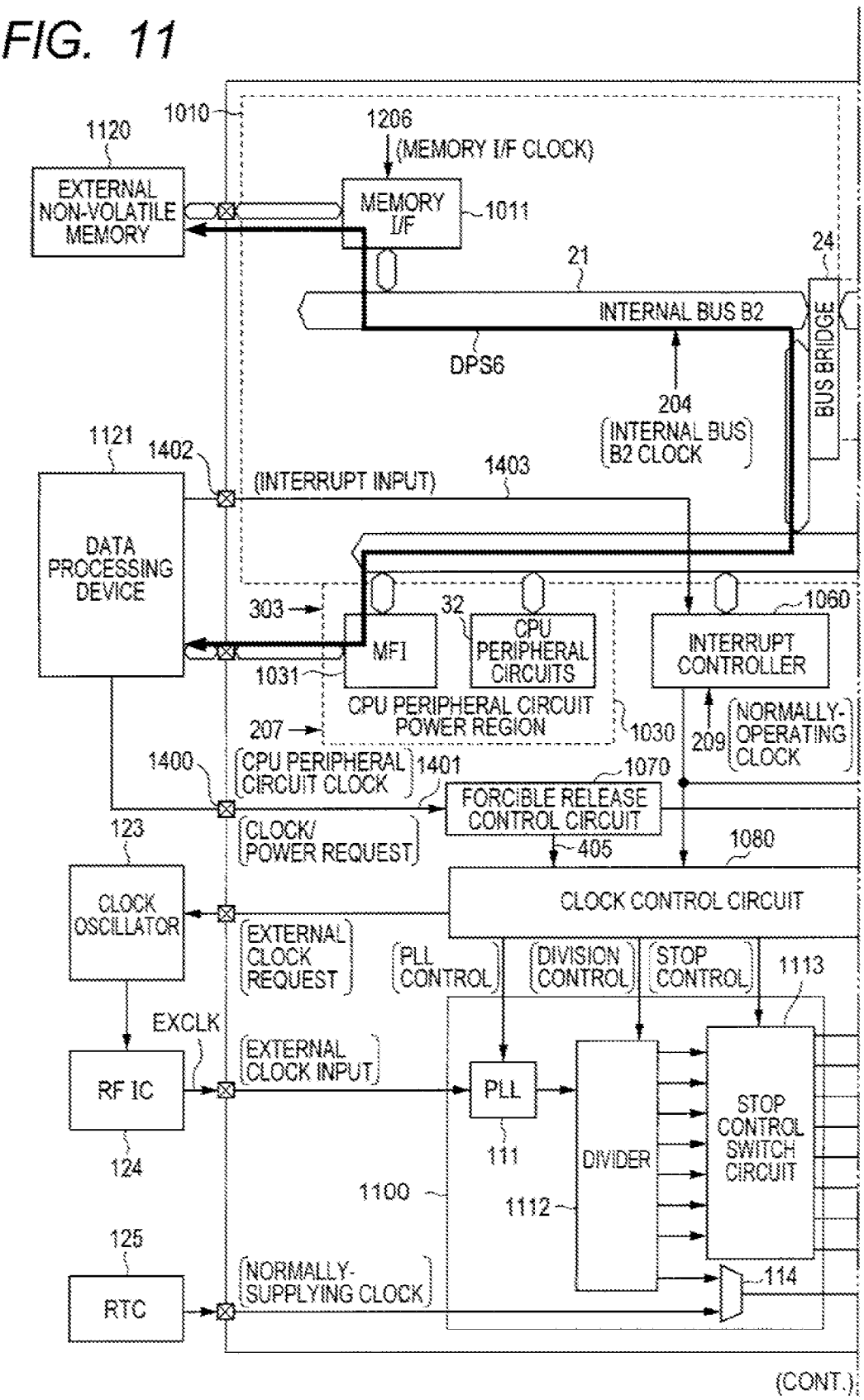
FIG. 11 is a block diagram illustrating a configuration of a microcomputer according to a third embodiment of the present invention.

A configuration of a microcomputer according to a third embodiment of the present invention is illustrated in FIG. 11. The microcomputer 1001 is one example of a semiconductor device. Although not limited in particular, the microcomputer 1001 is formed in a single semiconductor substrate like monocrystalline silicon by a complementary field-effect transistor manufacturing technology.

The microcomputer 1001 controls low power consumption by the stop and supply of power and clocks for each internal circuit block. An internal power switch circuit 1110 performs the supply of power to the inside of the microcomputer 1001, and a clock pulse generator (CPG) 1100 performs the supply of each clock to the inside. The internal power switch circuit 1110 outputs respective internal power 301, 303 through 307 and 1302, and the clock pulse generator 1100 outputs clocks 201 through 207, 209 and 1208.

The inside of the microcomputer 1001 is divided into a plurality of power regions in which the stop and supply of power are individually controlled from the internal power switch circuit 1110. The power regions are divided into, for example, an internal bus B1 power region 20A supplied with the power 305, an internal bus B2 and C power region 1010 supplied with the power 306, a CPU peripheral circuit power region 1030 supplied with the power 303, a CPU power region 40 supplied with the power 301, an accelerator power region 1050 supplied with the power 1302, and a normally power-on region supplied with the power 307, the normally power-on region being a region other than the other regions discussed above. Although the stop and supply of each clock are controlled synchronously with the stop and supply of power to each power region, clock signals different in frequency or the like are partly supplied to the same power region.

A CPU 41, which fetches each instruction, decodes the fetched instruction and executes it, is disposed in the CPU power region 40. The CPU 41 is supplied with the clock 201 and executes an instruction in sync with the clock 201.

An internal bus (B1) 25 coupled to the CPU 41 is disposed in the internal bus B1 power region 20A. The internal bus (B1) 25 is operated in sync with the clock 203.

The accelerator power region 1050 includes an internal bus (A) 53 coupled to the internal bus (B1) 25 via a bus bridge 51. A CPU 1052 coupled to the internal bus 53, and a CPU peripheral circuit 1054 controlled thereby are provided in the accelerator power region 1050. The circuits for the accelerator power region 1050 are operated in synch with the clock 302.

The internal bus B2 and C power region 1010 includes an internal bus (B2) 21 coupled to the internal bus (B1) 25 via a bus bridge 24, and an internal bus (C) 23 coupled to the internal bus 21. A memory interface 1011 is coupled to the internal bus 21. The internal bus (B2) 21 performs a transmission operation in sync with the clock 204, and the internal bus (C) 23 performs a transmission operation in sync with the clock 205. The memory interface 1011 controls a memory operation of an external non-volatile memory 1120 disposed outside the microcomputer 1001 in sync with a clock 1206.

A slave interface circuit (MFI) 1031 and separate CPU peripheral circuits 32, such as a timer respectively coupled to the internal bus 23 are disposed in the CPU peripheral circuit power region 1030. They are operated synchronously with the clock 207. The slave interface circuit 1031 is coupled to a data processing device 1121 used as, for example, a master device outside the microcomputer 1001. The slave interface circuit 1031 is slave-interface operated with respect to the data processing device 1121.

If, for example, a cellular phone is taken as one example, then the microcomputer 1001 is used as a baseband processor which performs baseband processing, and the data processing device 1121 is taken as an application processor widely used for other application operations. At this time, the slave interface circuit 1031 may comprise a circuit which performs interfacing so as to enable access to the external non-volatile memory 1120 or the like disposed in address space of the microcomputer 1001 from the data processing device 1121 used as the master device. In brief, the slave interface circuit 1031 enables direct access to the address space of the microcomputer 1001 in accordance with address information supplied by the data processing device 1121.

When, for example, the external non-volatile memory 1120 holds received data therein, the external data processing device 1121 reads the received data stored in the external non-volatile memory 1120 via the buses 23 and 21 and the memory interface circuit 1011 from the slave interface circuit 1031 (data path DPS 6).

Although not limited in particular, an interrupt controller 1060, a forcible release control circuit 1070, a clock control circuit 1080 and an internal power control circuit 1090, etc. are disposed in the normally power-on region supplied with the power 307 in addition to the clock pulse generator 1100 and the internal power switch circuit 1110. Each circuit for the normally power-on region is supplied with the normally-operating clock 209. Each circuit disposed outside the normally power-on region is taken as one example of a controlled circuit subject to control of the stop and supply of each clock and power.

A basic configuration of the clock pulse generator 1100 is the same as one employed in the first embodiment. The clock pulse generator 1100 supplies the clocks 201 through 207, 1208 and 209 to their corresponding parts through a phase-locked loop (PLL) 111, a divider 112 and a stop control switch circuit 1113.

The clock control circuit 1080 controls the stop and supply of the clocks 201 through 207, 1208 and 209 by the clock pulse generator 1100. The internal power control circuit 1090 controls the stop and supply of the respective power 301, 303, 305 through 307 and 1302 by the internal power switch circuit 1110. The forcible release control circuit 1070 performs control for causing the clock pulse generator 1100 and the internal power switch circuit 1110 to temporarily resume the supply of the clocks and power to each specific internal circuit controlled circuit) whose supply has been stopped by the control of the CPU 41, only during a period in which a power/clock request signal 1401 received at a first external input terminal 1400 is requested, and stopping the supply of the clocks and power again in response to a request's negation. Thus, the temporary resumption of the supply of the clock and power lasts only for the duration of the request.

In the present embodiment, the specific controlled circuits are assumed to be circuits for the power regions 1030 and 1010. Designated at numeral 1401 is a request signal used for the data processing device 1121 to request the forcible release of a low power consumption state relative to each of the circuits for the power regions 1030 and 1010. Designated at numeral 405 is a control signal for the forcible release and reset of the low power consumption state relative to each of the circuits for the power regions 1030 and 1010, which signal is supplied from the forcible release control circuit 1070 to the clock control circuit 1080. Designated at numeral 407 is a control signal for the forcible release and reset of the low power consumption state relative to each of the circuits for the power regions 1030 and 1010, which signal is supplied from the forcible release control circuit 1070 to the internal power control circuit 1090.

Since the clock control circuit 1080 and the internal power control circuit 1090 are substantially identical in basic configuration to those described in the first embodiment, their detailed explanations are omitted. The restoration of the CPU 41 from its low power consumption state is also substantially identical to the first embodiment.

When an interrupt request 1403 is input from a second external terminal 1402 to the interrupt controller 1060, the interrupt controller 1060 outputs an interrupt signal to the CPU 41 in response to it and activates a reset request signal 403 to initialize CPU 41 corresponding bits at registers 81 through 84 and 91 into a supply enable state respectively, thereby making it possible to resume the supply of power and clocks to the CPU 41.

The third embodiment differs from the first and second embodiments in that the supply/stop of the power and clocks are forcibly released in accordance with the input 1401 from the first external input terminal 1400. As discussed above, the first external input terminal 1400 is connected to an external data processing device 1121 which functions as the requesting circuit. Thus, similarly even in the case of the second embodiment, it is not necessary to interpose the CPU 41 when the CPU 41 itself forcibly releases the state of stop of the power and clocks set to each of the circuits for the power regions 1030 and 1010. There is therefore no need to restore the CPU 41 to its operable state to forcibly release the low power consumption state of each of other internal circuits in the low power consumption state of the CPU 41. This can contribute to low power consumption of the microcomputer 1001 and the shortening of its processing time in this regard. If the request for the supply of the power and clocks from the data processing device 1121 (serving as a requesting circuit) which requested the forcible release is ended, then the CPU 41 is restored to its original low power consumption state. In brief, since the operation relative to each of the registers 81 through 84 and 91 is not performed as in the case of the restoration of the CPU 41 from the standby state by the interrupt request, the CPU 41 can simply be returned to the low power consumption state previously set by the execution of an instruction by the CPU 41 if the forcible release request is negated. Accordingly, control for defining a relationship between the forcible release and reset relative to the state of stop of the power and clocks previously set by the execution of the instruction by the CPU 41 becomes simple.

Figure 12:
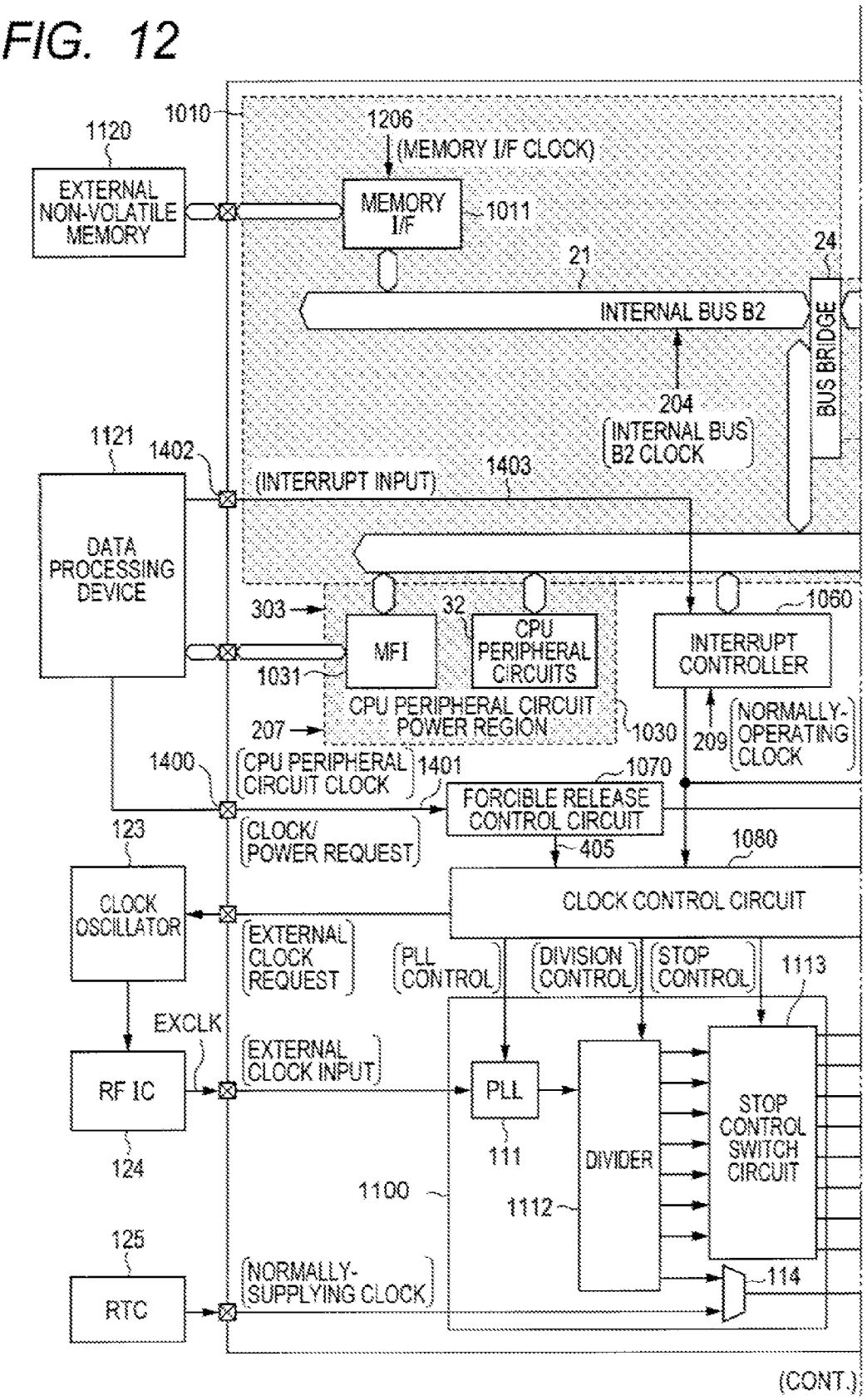
FIG. 12 is a block diagram showing a state of the supply of clocks and power in a standby state of the microcomputer 1001 of FIG. 11.
Figure 13:
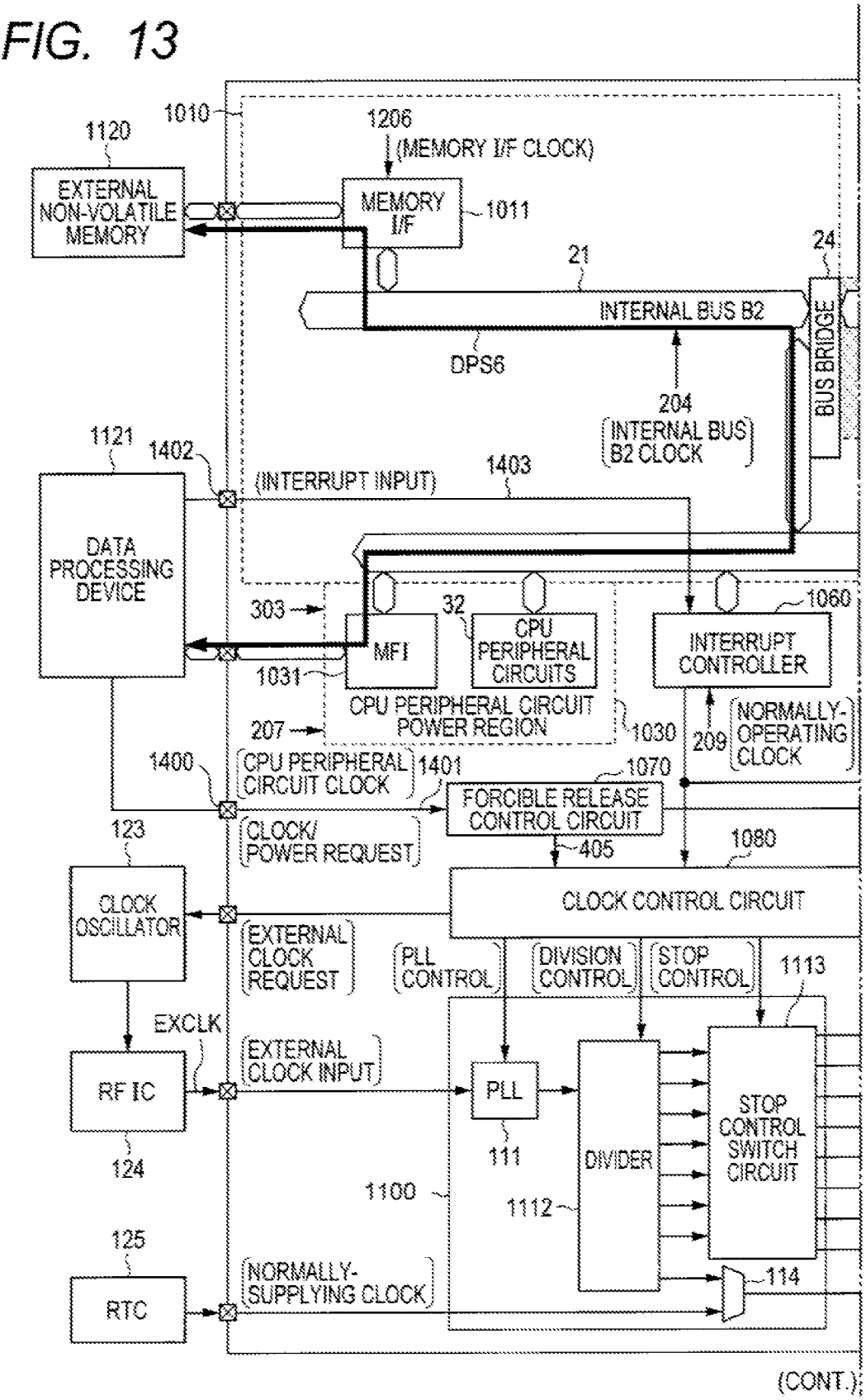
FIG. 13 is a block diagram showing a state in which the cutoff of power and clocks is released where an external data processing device 1121 attempts to obtain access to a nonvolatile memory 1120 located in address space of the microcomputer 1001 in the microcomputer of FIG. 11.

In the standby state of the microcomputer 1001, the supply of clocks and power is cut off to power regions indicated by the shaded regions illustrated in FIG. 12 to thereby make it possible to achieve low power consumption. When the data processing device 1121 tries to access the non-volatile memory 1120 disposed in the address space of the microcomputer 1001 in this state, the external data processing device 1121 may assert the request signal 1401 from the first external terminal 1400. Thus, as illustrated in FIG. 13, the state of cutoff of the power and clocks in each of the power regions 1010 and 1030 is released and thereby access to the non-volatile memory 1120 is enabled. After the completion of the access thereto, the microcomputer 1001 is restored to the standby state of FIG. 12 only by negating the request signal 1401.

Since the present embodiment is similar to the first embodiment in other respects, detailed explanations are omitted. For example, the clock control circuit includes the registers 81 through 84, the PLL control circuit 86 and the like in a manner similar to the first embodiment. Detailed explanations of other circuits will also be omitted in like manner.

[Fourth Embodiment]

Figure 14:
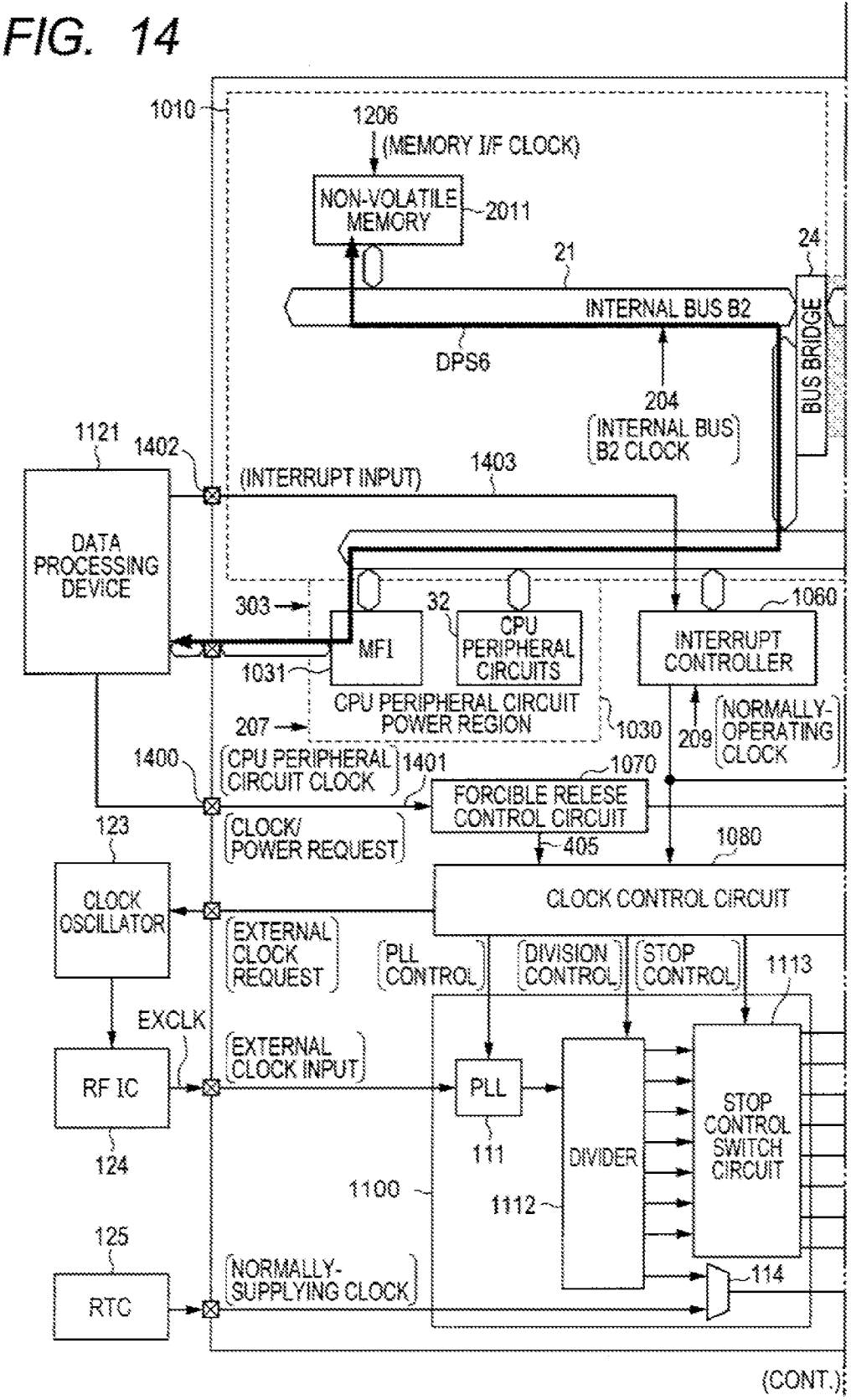
FIG. 14 is a block diagram illustrating a microcomputer according to a fourth embodiment of the present invention.

A microcomputer 2001 according to a fourth embodiment of the present invention is illustrated in FIG. 14. The microcomputer 2001 of the fourth embodiment differs from the microcomputer 1001 of the third embodiment in that a non-volatile memory 2011 is provided in a power region 1010 as an internal memory instead of the memory interface circuit 1011. In a manner similar to the third embodiment even in the case of this example, a data processing device 1121 serves as the requesting circuit and asserts a request signal 1401 from a first external terminal 1400 to thereby temporarily resume the supply of respective power 306 and 303 and clocks 205 and 207 to their corresponding regions 1010 and 1030 which had been set to a low power consumption state by a CPU 41. This makes it possible for the external data processing device 1121 to obtain access to the on-chip non-volatile memory 2011. The microcomputer is restored to its original low power consumption state only after the external data processing device 1121 negates the request signal 1401 after the completion of required access.

Since the fourth embodiment is similar to the third embodiment in other respects, detailed explanations are omitted.

While the invention made above by the present inventors has been described specifically on the basis of the preferred embodiments, the present invention is not limited to the embodiments referred to above. Various changes can be made thereto within the scope not departing from the gist thereof.

For example, the period of activation (i.e., duration) of a request signal supplied to a forcible release control circuit is not limited to a predetermined level period of the request signal, but may be a period from the first change in pulse to the next change in pulse or a signal of plural bits.

A circuit targeted for the forcible release of the stop of the power and clocks by the request signal is not limited to a DRAM interface. A circuit that requests a forcible release is not limited to a signal processing unit. They may be modified as appropriate. Circuits targeted for the forcible release of the stop of power and clocks in accordance with a request from an external terminal are not limited to a slave interface circuit and a memory interface circuit, but may be modified as appropriate.

Also, the numbers of circuits that request the forcible release of power and clocks inside and outside a microcomputer and the numbers of external terminals therefor may be more than one.

A semiconductor device is not limited to a microcomputer of a multiprocessor configuration, but may be an appropriate data processing semiconductor integrated circuit and data processing semiconductor module. A data processing system is not limited to a system provided with a baseband processor and an application processor, which is applied to a cellular phone.

What is claimed is:

1. A semiconductor device comprising:
a central processing unit for controlling a stop and supply of power and clocks, and for executing instructions;
a plurality of controlled circuits subject to control of the stop and supply of the power and clocks;
power and clock control circuits which control the stop and supply of the power and clocks relative to the central processing unit and the controlled circuits, based on execution of one or more instructions by the central processing unit; and
a forcible release control circuit which forcibly releases the supply and stop of the power and clocks that are conducted on one or more predetermined controlled circuits by the power and clock control circuits, only during a period required by a power and clock request signal outputted from a requesting circuit, to thereby temporarily resume supply of the power and clocks to the one or more predetermined controlled circuits and thus enable operation of at least one resource required by the requesting circuit.

2. A semiconductor device comprising:
a central processing unit for controlling a stop and supply of power and clocks, and for executing instructions;
a plurality of controlled circuits subject to control of the stop and supply of the power and clocks;
power and clock control circuits which control the stop and supply of the power and clocks relative to the central processing unit and the controlled circuits, based on execution of one or more instructions by the central processing unit; and
a forcible release control circuit which forcibly releases the supply and stop of the power and clocks that are conducted on one or more predetermined controlled circuits by the power and clock control circuits, only during a period required by a power and clock request signal outputted from a requesting circuit;
wherein the power and clock control circuits comprise:
control registers which hold control data for controlling the stop and supply of the power and clocks to the plurality of the controlled circuits, and
control logics which input the control data in the control registers and an instruction signal to the forcible release control circuit to thereby control the supply and stop of the power and clocks relative to the controlled circuits, and
wherein each of the control logics:
allows the power and clocks to be supplied when the control data indicates the supply of the power and clocks,
allows the power and clocks to stop when the control data indicates the stop of the power and clocks and the power and clock request signal indicates no request for the supply of the power and clocks, and
allows the power and clocks to be supplied when the control data indicates the stop of the power and clocks and the power and clock request signal requests the supply of the power and clocks.

3. A semiconductor device comprising:
a central processing unit for controlling a stop and supply of power and clocks, and for executing instructions;
a plurality of controlled circuits subject to control of the stop and supply of the power and clocks;
power and clock control circuits which control the stop and supply of the power and clocks relative to the central processing unit and the controlled circuits, based on execution of one or more instructions by the central processing unit; and
a forcible release control circuit which forcibly releases the supply and stop of the power and clocks that are conducted on one or more predetermined controlled circuits by the power and clock control circuits, only during a period required by a power and clock request signal outputted from a requesting circuit;
wherein the forcible release control circuit receives state signals each indicative of a state of the supply and stop of power and clocks to the controlled circuits from the power and clock control circuits and controls a first timing provided to release the supply and stop of the power and clocks and a second timing provided to restore the same from the release, referring to the received state signals.

4. The semiconductor device according to claim 3, wherein the forcible release control circuit controls a first timing provided to release the supply and stop of the power and clocks and a second timing provided to restore the same from the release, using a timer.

5. The semiconductor device according to claim 3, further comprising an interrupt controller which causes the power and clock control circuits to resume the supply of power and clocks to the central processing unit whose supply has been stopped, in response to an interrupt request supplied from the requesting circuit.

6. A semiconductor device comprising:
a central processing unit for controlling a stop and supply of power and clocks, and for executing instructions;
a plurality of controlled circuits subject to control of the stop and supply of the power and clocks;
power and clock control circuits which control the stop and supply of the power and clocks relative to the central processing unit and the controlled circuits, based on execution of one or more instructions by the central processing unit;
a forcible release control circuit which forcibly releases the supply and stop of the power and clocks that are conducted on one or more predetermined controlled circuits by the power and clock control circuits, only during a period required by a power and clock request signal outputted from a requesting circuit; and
an interrupt controller which causes the power and clock control circuits to resume the supply of power and clocks to the central processing unit whose supply has been stopped, in response to an interrupt request supplied from the requesting circuit;
wherein the requesting circuit comprises a data processing circuit for processing data fetched therein, and
wherein said one or more predetermined controlled circuits comprises a first interface circuit for supplying data to be fetched into the requesting circuit, based on a request issued from the requesting circuit.

7. The semiconductor device according to claim 6, further comprising a second interface circuit which obtains data to be supplied to the requesting circuit by said one or more predetermined controlled circuits, through the control of the central processing unit.

8. The semiconductor device according to claim 7,
wherein the data processing circuit comprises a DMAC, a buffer memory which retains data captured by the DMAC, and an arithmetic circuit which performs arithmetic processing on the data fetched into the buffer memory,
wherein the first interface circuit comprises a memory controller which controls a memory coupled to the outside of the semiconductor device, and
wherein the second interface circuit comprises a file memory controller which controls a file memory coupled to the outside of the semiconductor device.

9. A data processing system comprising:
the semiconductor device according to claim 8;
a memory coupled to the memory controller included in the semiconductor device from the outside of the semiconductor device; and
a file memory coupled to the file memory controller included in the semiconductor device from the outside of the semiconductor device.

10. A semiconductor device comprising:
a central processing unit for controlling a stop and supply of power and clocks, and for executing instructions;
a plurality of controlled circuits subject to control of the stop and supply of the power and clocks;
power and clock control circuits which respectively control the stop and supply of the power and clocks to the central processing unit and the controlled circuits, based on execution of one or more instructions by the central processing unit; and
a forcible release control circuit which forcibly releases the supply and stop of the power and clocks, conducted on one or more predetermined controlled circuits by the power and clock control circuits only during a period required by a power and clock request signal received at a first external input terminal of the semiconductor device, to thereby temporarily resume supply of the power and clocks to the one or more predetermined controlled circuits and thus enable operation of at least one resource required by an external circuit issuing said request signal.

11. The semiconductor device according to claim 10,
wherein the one or more predetermined controlled circuits comprise a first controlled circuit controlled from the outside of the semiconductor device and a second controlled circuit controlled by the first controlled circuit.

12. A semiconductor device comprising:
a central processing unit for controlling a stop and supply of power and clocks, and for executing instructions;
a plurality of controlled circuits subject to control of the stop and supply of the power and clocks;
power and clock control circuits which respectively control the stop and supply of the power and clocks to the central processing unit and the controlled circuits, based on execution of one or more instructions by the central processing unit; and
a forcible release control circuit which forcibly releases the supply and stop of the power and clocks, conducted on one or more predetermined controlled circuits by the power and clock control circuits only during a period required by a power and clock request signal received at a first external input terminal of the semiconductor device;
wherein the power and clock control circuits comprise:
control registers which hold control data for controlling the stop and supply of power and clocks to the plurality of the controlled circuits, and
control logics which respectively input the control data in the control registers and an instruction signal to the forcible release control circuit to thereby control the supply and stop of the power and clocks to the controlled circuits, and
wherein each of the control logics:
allows the power and clocks to be supplied when the control data indicates the supply of the power and clocks,
allows the power and clocks to stop when the control data indicates the stop of the power and clocks and the power and clock request signal indicates no request for the supply of the power and clocks, and
allows the power and clocks to be supplied when the control data indicates the stop of the power and clocks and the power and clock request signal requests the supply of the power and clocks.

13. A semiconductor device comprising:
a central processing unit for controlling a stop and supply of power and clocks, and for executing instructions;

a plurality of controlled circuits subject to control of the stop and supply of the power and clocks:

power and clock control circuits which respectively control the stop and supply of the power and clocks to the central processing unit and the controlled circuits, based on execution of one or more instructions by the central processing unit; and a forcible release control circuit which forcibly releases the supply and stop of the power and clocks, conducted on one or more predetermined controlled circuits by the power and clock control circuits only during a period required by a power and clock request signal received at a first external input terminal of the semiconductor device;

wherein the predetermined controlled circuit comprises a slave interface circuit which is slave-interface operated with respect to an external device which functions as a requesting circuit and produces the power and clock request signal received at the first external input terminal.

14. The semiconductor device according to claim 13, further comprising an interrupt controller which causes the power and clock control circuits to resume the supply of power and clocks to the central processing unit whose supply has been stopped, in response to an interrupt request received at a second external input terminal.

15. A data processing system comprising:
the semiconductor device according to claim 14, wherein:
the slave interface circuit is included in the semiconductor device; and
the external device is coupled to the first external input terminal and the second external input terminal.

16. A semiconductor device comprising:
a central processing unit for controlling a stop and supply of power and clocks, and for executing instructions;
a plurality of controlled circuits subject to control of the stop and supply of the power and clocks;
power and clock control circuits which respectively control the stop and supply of the power and clocks to the central processing unit and the controlled circuits, based on execution of one or more instructions by the central processing unit; and
a forcible release control circuit which forcibly releases the supply and stop of the power and clocks, conducted on one or more predetermined controlled circuits by the power and clock control circuits only during a period required by a power and clock request signal received at a first external input terminal of the semiconductor device;
wherein the one or more predetermined controlled circuits comprise a first controlled circuit controlled from the outside of the semiconductor device and a second controlled circuit controlled by the first controlled circuit;
wherein the first controlled circuit comprises a slave interface circuit which is slave-interface operated by an external data processing device coupled to the first external input terminal, and
wherein the second controlled circuit comprises a memory interface circuit controlled by the slave interface circuit and the central processing unit.

17. The semiconductor device according to claim 16, further comprising an interrupt controller which causes the power and clock control circuits to resume the supply of power and clocks to the central processing unit whose supply has been stopped, in response to an interrupt request received at a second external input terminal.

18. A data processing system comprising:
the semiconductor device according to claim 17; wherein:
the external data processing device is coupled to the first external terminal and also to the second external terminal; and
an external memory device is coupled to the memory interface circuit.

19. The
A semiconductor device comprising:
a central processing unit for controlling a stop and supply of power and clocks, and for executing instructions;
a plurality of controlled circuits subject to control of the stop and supply of the power and clocks:
power and clock control circuits which respectively control the stop and supply of the power and clocks to the central processing unit and the controlled circuits, based on execution of one or more instructions by the central processing unit; and
a forcible release control circuit which forcibly releases the supply and stop of the power and clocks, conducted on one or more predetermined controlled circuits by the power and clock control circuits only during a period required by a power and clock request signal received at a first external input terminal of the semiconductor device;
wherein the one or more predetermined controlled circuits comprise a first controlled circuit controlled from the outside of the semiconductor device and a second controlled circuit controlled by the first controlled circuit;
wherein the first controlled circuit comprises a slave interface circuit which is slave-interface operated by an external data processing device coupled to the first external input terminal, and
wherein the second controlled circuit comprises an internal memory controlled by the slave interface circuit and the central processing unit.

20. The semiconductor device according to claim 19, further comprising an interrupt controller which causes the power and clock control circuits to resume the supply of power and clocks to the central processing unit whose supply has been stopped, in response to an interrupt request received at a second external input terminal.

21. A data processing system comprising:
the semiconductor device according to claim 20; wherein:
the external data processing device is coupled to the first external terminal and also to the second external terminal.

22. A semiconductor device comprising:
a central processing unit for controlling a setting and release of a low power consumption state, and for executing instructions;
a plurality of controlled circuits each subject to control of a setting and release of a low power consumption state;
a low power consumption control circuit which controls the setting and release of the low power consumption state to and from the central processing unit and the controlled circuits, based on execution of one or more instructions by the central processing unit; and
a forcible release control circuit which forcibly releases a low power consumption state set to a predetermined controlled circuit by the low power consumption control circuit only during a period required by a request signal outputted from a requesting circuit, to thereby temporarily resume power to said predetermined controlled circuit and thus enable operation of at least one resource required by the requesting circuit.

23. A semiconductor device comprising:
a central processing unit for controlling a setting and release of a low power consumption state, and for executing instructions;
a plurality of controlled circuits each subject to control of a setting and release of a low power consumption state;
a low power consumption control circuit which controls the setting and release of the low power consumption state to and from the central processing unit and the controlled circuits, based on execution of one or more instructions by the central processing unit; and
a forcible release control circuit which forcibly releases a low power consumption state set to a predetermined controlled circuit by the low power consumption control circuit only during a period required by a request signal received at a first external input terminal, to thereby temporarily resume power to said predetermined controlled circuit and thus enable operation of at least one resource required by an external circuit issuing said request signal.

24. A semiconductor device comprising:
a central processing unit (CPU) configured to execute instructions and capable of entering a low power consumption state in response to one or more of said instructions;
a plurality of controlled circuits, each capable of being placed in a low power consumption state in response to one or more of said instructions;
a forcible release control circuit configured to:
receive a request signal from a requesting circuit; and
in response to the request signal and only during a period required by the request signal, release a first low power consumption state of a predetermined one of said plurality of controlled circuits which has been placed in the first low power consumption state by the CPU, so that the requesting circuit is able to use said predetermined one of said plurality of controlled circuits; and
an interrupt controller configured to:
receive an interrupt request from said requesting circuit; and
in response to the interrupt request, output at least one signal to restore the CPU to an operable state from a second low power consumption state of the CPU.

25. The semiconductor device according to claim 24, wherein:
the forcible release control circuit is configured to receive a plurality of state signals indicative of a power consumption state of one or more of said plurality of controlled circuits; and
in response to said plurality of state signals, the forcible release control circuit is configured to output an activated signal to the requesting circuit to indicate that the requesting circuit can use said predetermined one of said plurality of controlled circuits.

26. The semiconductor device according to claim 24, wherein the forcible release control circuit comprises a timer configured to:
provide a first timing to release the first low power consumption state of said predetermined one of said plurality of controlled circuits, and
provide a second timing to restore the first low power consumption state of said predetermined one of said plurality of controlled circuits.

27. The semiconductor device according to claim 24, wherein:
the requesting circuit comprises a signal processing unit (SPU) internal to the semiconductor device and configured to output the request signal received by the forcible release control circuit; and
the SPU is configured to process audio data and output an audio signal.

28. The semiconductor device according to claim 24, wherein:
the request signal is received by the forcible release control circuit at a first external input terminal of the semiconductor device.

29. The semiconductor device according to claim 28, in combination with a data processing device which:
functions as the requesting circuit;
is coupled to the first external input terminal of the semiconductor device, and
is configured to output said request signal to the forcible control release circuit.

30. The semiconductor device according to claim 29, wherein:
the data processing device is coupled to a second external input terminal of the semiconductor device, and configured to output said interrupt request to the interrupt controller.

31. The semiconductor device according to claim 29, wherein:
said predetermined one of said plurality of controlled circuits comprises a slave interface circuit which is slave-interface operated with respect to the data processing device; and
the data processing device is configured to access a memory external to the semiconductor device via the slave interface circuit.

32. The semiconductor device according to claim 31, wherein:
said predetermined one of said plurality of controlled circuits further comprises a memory interface circuit; and
the data processing device is configured to access said memory external to the semiconductor device via the slave interface circuit and the memory interface circuit.

33. The semiconductor device according to claim 29, wherein:
said predetermined one of said plurality of controlled circuits comprises a slave interface circuit which is slave-interface operated with respect to the data processing device; and
the data processing device is configured to access a memory internal the semiconductor device via the slave interface circuit.

34. A semiconductor device comprising:
a requesting circuit configured to output a first request signal;
a central processing unit (CPU) configured to execute instructions and selectively occupy a low power consumption state;
a plurality of controlled circuits, each configured to selectively occupy a low power consumption state;
a forcible release control circuit configured to:
receive the first request signal from the requesting circuit; and
in response to the first request signal, release a low power consumption state of a first controlled circuit assembly comprising one or more controlled circuits so that the requesting circuit is capable of accessing said first controlled circuit assembly; and an interrupt controller configured to:

receive an interrupt request from said requesting circuit; and in response to the interrupt request, output at least one signal to restore the CPU to an operable state from a low power consumption state of the CPU;

wherein:

following receipt of the interrupt request, a low power consumption state of a second controlled circuit assembly is released, the second controlled circuit assembly comprising one or more controlled circuits, at least one of which is different from the one or more controlled circuits belonging to the first controlled circuit assembly; and in the operable state, the CPU is capable of accessing the second controlled circuit assembly.

35. The semiconductor device according to claim 34, wherein:

the forcible release control circuit is further configured to resume the low power consumption state of said first controlled circuit assembly, after the requesting circuit has accessed said first controlled circuit assembly; and the CPU resumes the low power consumption state of the CPU, after the CPU has accessed the second controlled circuit assembly.

36. The semiconductor device according to claim 34, wherein, without restoring the CPU to the operable state from the low power consumption state of the CPU:

the low power consumption state of the first controlled circuit assembly is released; and the requesting circuit accesses the first controlled circuit assembly.

37. The semiconductor device according to claim 34, wherein:

the first controlled circuit assembly and the second controlled circuit assembly are disjoint and have no controlled circuits in common; and in the operable state, the CPU is capable of accessing both the second controlled circuit assembly and the first controlled circuit assembly.

38. The semiconductor device according to claim 37, wherein:

if the CPU is restored to the operable state pursuant to an interrupt request while the requesting circuit is accessing the first controlled circuit assembly, the forcible release control circuit does not resume the low power consumption state of the first controlled circuit assembly even after the requesting circuit has finished access thereto.

39. The semiconductor device according to claim 34, further comprising:

a first memory associated with the requesting circuit;

a second memory configured to supply first data to the first memory via a first interface circuit which belongs to the first controlled circuit assembly; and a third memory configured to supply second data to the second memory via a second interface circuit which belongs to the second controlled circuit assembly, wherein:

even when the CPU is in the low power consumption state of the CPU, the first data is supplied from the second memory to the first memory following receipt of the first request signal at the forcible release control circuit.

40. The semiconductor device according to claim 39, wherein:

the second data is supplied from the third memory to the second memory only when the CPU is in the operable state, after receipt of the interrupt request at the interrupt controller.

* * * * *